US012710807B2

(12) United States Patent
Hwang et al.

(10) Patent No.: US 12,710,807 B2
(45) Date of Patent: Aug. 18, 2026

(54) DYNAMICALLY ORIENTATED LABELS FOR XR USER INTERFACES

(71) Applicant: Snap Inc., Santa Monica, CA (US)

(72) Inventors: Viktoria Hwang, Monrovia, CA (US); James Powderly, Venice, CA (US); Karen Stolzenberg, Venice, CA (US); Mathieu Emmanuel Vignau, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/823,412

(22) Filed: Sep. 3, 2024

(65) Prior Publication Data

US 2026/0064186 A1 Mar. 5, 2026

(51) Int. Cl.
*G06F 3/01* (2006.01)
*G06F 3/04815* (2022.01)

(52) U.S. Cl.
CPC ............. *G06F 3/011* (2013.01); *G06F 3/017* (2013.01); *G06F 3/04815* (2013.01)

(58) Field of Classification Search
CPC ....... G06F 3/011; G06F 3/04815; G06F 3/017
See application file for complete search history.

(56) References Cited

U.S. PATENT DOCUMENTS

| | | | |
|---|---|---|---|
| 7,971,156 | B2 | 6/2011 | Albertson et al. |
| 9,225,897 | B1 | 12/2015 | Sehn et al. |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |

(Continued)

FOREIGN PATENT DOCUMENTS

| | | | |
|---|---|---|---|
| EP | 3707693 | A1 | 9/2020 |
| EP | 4172726 | A1 | 5/2023 |

(Continued)

OTHER PUBLICATIONS

"International Application Serial No. PCT US2025 042009, International Search Report mailed Oct. 29, 2025", 5 pgs.

(Continued)

*Primary Examiner* — Adam R. Giesy
(74) *Attorney, Agent, or Firm* — Schwegman Lundberg & Woessner, P.A.

(57) ABSTRACT

An extended Reality (XR) system is provided that enhances user interaction within XR environments. The XR system captures tracking data using one or more sensors, including hand tracking data of a user's hand and pose data of the XR system itself. By continuously capturing this data, the XR system dynamically generates a hand-located user interface that includes interactive virtual objects associated with specific locations on the surface of the user's hand. Additionally, the XR system generates labels for the interactive virtual objects that are dynamically oriented toward the user as the user moves their hands and head when interacting with an XR environment.

20 Claims, 18 Drawing Sheets

(56) References Cited

U.S. PATENT DOCUMENTS

| | | | |
|---|---|---|---|
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,501,504 B2 | 11/2022 | Rohan | |
| 11,531,402 B1 | 12/2022 | Stolzenberg | |
| 11,546,505 B2 | 1/2023 | Canberk | |
| 11,798,201 B2 | 10/2023 | Eirinberg et al. | |
| 2012/0113223 A1 | 5/2012 | Hilliges et al. | |
| 2013/0016070 A1* | 1/2013 | Starner | G06F 3/011 345/175 |
| 2015/0269783 A1 | 9/2015 | Yun | |
| 2016/0224123 A1* | 8/2016 | Antoniac | G06F 3/04815 |
| 2017/0352196 A1 | 12/2017 | Chen et al. | |
| 2019/0146219 A1* | 5/2019 | Rodriguez | G06F 3/0482 345/633 |
| 2019/0265781 A1 | 8/2019 | Kehoe et al. | |
| 2020/0202121 A1 | 6/2020 | Konin et al. | |
| 2021/0011612 A1 | 1/2021 | Dancie et al. | |
| 2021/0074016 A1 | 3/2021 | Li et al. | |
| 2021/0089131 A1 | 3/2021 | Wang et al. | |
| 2021/0166732 A1 | 6/2021 | Shaburova et al. | |
| 2021/0174034 A1 | 6/2021 | Retek et al. | |
| 2021/0191600 A1 | 6/2021 | Lemay et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2023/0031913 A1* | 2/2023 | Ishikawa | G06T 19/006 |
| 2023/0117197 A1 | 4/2023 | Stolzenberg | |
| 2025/0298469 A1 | 9/2025 | Chen | |

FOREIGN PATENT DOCUMENTS

| | | | |
|---|---|---|---|
| EP | 4172730 | A1 | 5/2023 |
| KR | 20220158824 | A | 12/2022 |
| WO | 2019094618 | A1 | 5/2019 |
| WO | 2022005687 | A1 | 1/2022 |
| WO | 2022005693 | A1 | 1/2022 |
| WO | 2022060549 | A3 | 3/2022 |
| WO | 2022066578 | A1 | 3/2022 |
| WO | 2022060549 | A2 | 4/2022 |
| WO | 2022132381 | A1 | 6/2022 |
| WO | 2022146678 | A1 | 7/2022 |
| WO | 2022198182 | A1 | 9/2022 |
| WO | 2022216784 | A1 | 10/2022 |
| WO | 2022225761 | A1 | 10/2022 |
| WO | 2022245765 | A1 | 11/2022 |
| WO | 2026054950 | | 3/2026 |

OTHER PUBLICATIONS

"International Application Serial No. PCT US2025 042009, Written Opinion mailed Oct. 29, 2025", 7 pgs.

"U.S. Appl. No. 19/042,855, Non Final Office Action mailed Nov. 5, 2025", 13 pgs.

"U.S. Appl. No. 19/042,855, Response filed Jan. 20, 2026 to Non Final Office Action mailed Nov. 5, 2025", 13 pgs.

"U.S. Appl. No. 19/042,855, Notice of Allowance mailed Mar. 4, 2026", 7 pgs.

"International Application Serial No. PCT US2026 012817, International Search Report mailed Apr. 10, 2026", 5 pgs.

"International Application Serial No. PCT US2026 012817, Written Opinion mailed Apr. 10, 2026", 8 pgs.

* cited by examiner

DYNAMICALLY ORIENTATED LABELS FOR XR USER INTERFACES

TECHNICAL FIELD

The present disclosure relates generally to user interfaces and, more particularly, to user interfaces used for extended reality.

BACKGROUND

A head-wearable apparatus can be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus can additionally completely occlude a user's visual field and display a virtual environment through which a user can move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term extended Reality (XR) refers to augmented reality, virtual reality and any of hybrids of these technologies unless the context indicates otherwise.

A user of the head-wearable apparatus can access and use a computer software application to perform various tasks or engage in an activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1A:
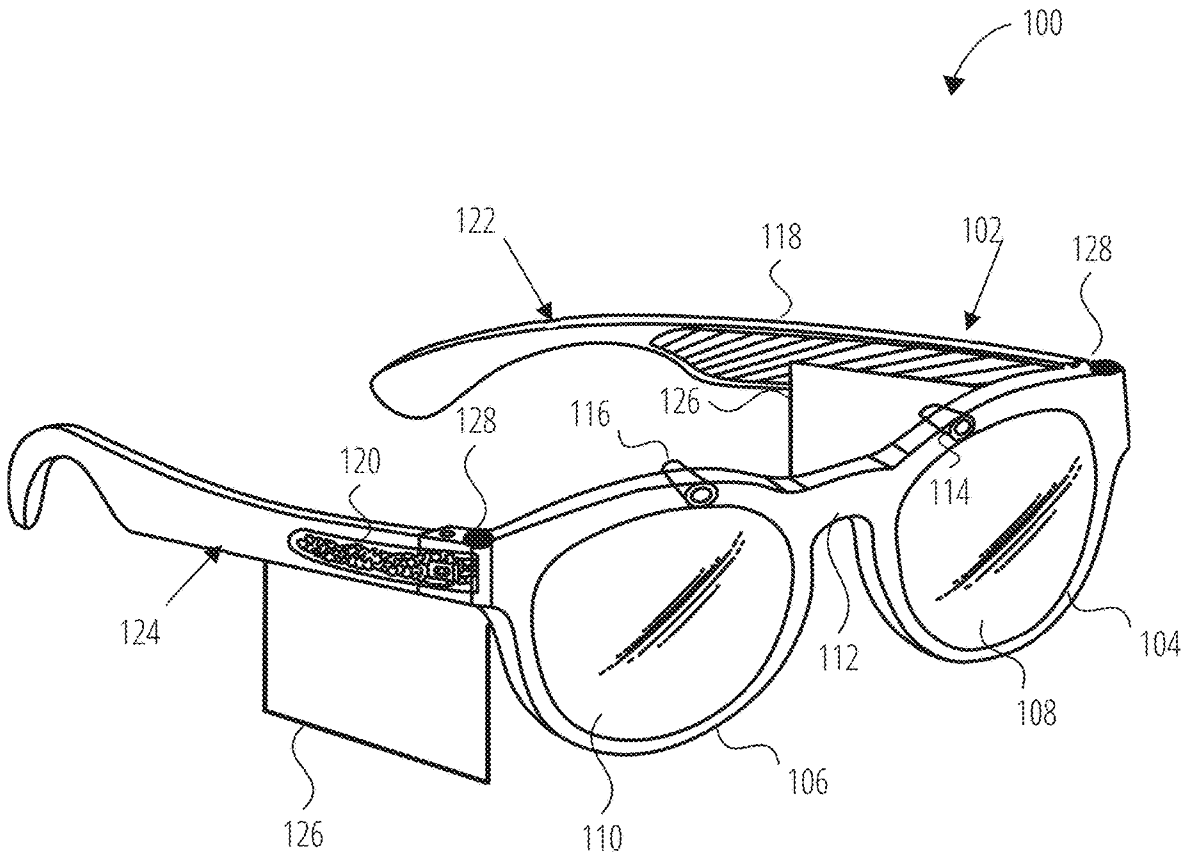
FIG. 1A is a perspective view of a head-wearable apparatus, according to some examples.

The development of user interfaces for XR systems has been an area of technological advancement, particularly in the realm of head-wearable apparatuses. These devices, which overlay digital content onto the real world or create entirely virtual environments, present unique challenges in terms of user interaction and interface design. One issue is the difficulty users face in interacting with interfaces that are not optimally aligned or sized according to their personal ergonomic needs. Traditional static interfaces often fail to accommodate the wide variation in individual user hand sizes and movements, leading to a less intuitive and more cumbersome user experience.

Another problem in the field of XR interface design is the lack of dynamic responsiveness of the user interfaces to the changing perspectives and positions of the user. In many existing systems, the interface elements such as buttons and labels remain static, not only in size but also in their orientation relative to the user's viewpoint. This static approach can disrupt the immersive experience of XR, making the digital overlays feel disconnected from the user's natural interactions with their environment. The inability of these systems to adapt the interface elements dynamically based on the user's hand orientation and proximity can lead to decreased efficiency and increased user frustration, particularly in applications requiring precise and frequent interactions.

Various aspects of this disclosure address these problems by introducing a dynamic and user-responsive interface system for XR applications. These methodologies enhance user interaction by adapting interface elements in real-time to the user's physical characteristics and movements. For instance, the methodologies incorporate a method for dynamically resizing interface elements such as interactive virtual objects based on the measurements of the user's hand. This adaptation ensures that the interface is ergonomically optimized for each user, regardless of hand size, enhancing accessibility and ease of use.

Additional methodologies include orienting interface labels and icons to align with the user's viewpoint. This feature solves the problem of static interfaces by ensuring that all interface elements are consistently legible and appropriately oriented, regardless of how the user moves their hand or head. This dynamic orientation is achieved through real-time tracking of both the hand's position and the user's head orientation, allowing the interface to maintain an optimal alignment with the user's line of sight.

These methodologies not only improve the usability of XR systems but also enhance the immersive experience by making digital interactions feel more natural and integrated with the user's movements and environment. The ability of the interface to adapt seamlessly to individual users and their actions helps in reducing cognitive load and increasing the efficiency of interactions within XR environments. This adaptive approach provides a more intuitive and user-friendly experience that is useful for the widespread adoption of XR technologies.

In some examples, an XR system captures tracking data using one or more sensors of the XR system. The tracking data encompasses hand tracking data of a user's hand and pose data of the XR system itself. As the XR system continuously captures both the tracking data and the pose data, the XR system generates a hand-located user interface that includes interactive virtual objects strategically positioned on specific surfaces of the user's hand. These surfaces can vary, including both the dorsal and palmar surfaces, depending on the specific application. Each interactive virtual object is associated with a dynamically generated label. This label is oriented according to the user's viewpoint, ensuring that the label remains legible regardless of how the user moves their hand or head.

In some examples, the XR system measures the distance between two landmarks on the user's hand such as the wrist and the middle knuckle. Using this measurement, the XR system adjusts the size of the interactive virtual objects to fit the user's hand size more accurately. In some examples, this adjustment is not arbitrary but is done in calculated steps, ensuring a smooth transition and optimal sizing for ease of interaction.

Other technical features can be readily apparent to one skilled in the art from the following figures, descriptions, and claims.

FIG. 1A is a perspective view of a head-wearable apparatus 100 according to some examples. The head-wearable apparatus 100 can be a client device of an XR system, such as a user system 302 of FIG. 3. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples, the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry 224, high-speed circuitry 226, and a display processor. Various other examples can include these elements in different configurations or integrated together in different ways. Additional details of aspects of the computer 120 can be implemented as illustrated by the machine 400 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional cameras (e.g., two or more cameras).

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide tracking image data for use by the head-wearable apparatus 100 to extract 3D information from a real-world environment.

The head-wearable apparatus 100 can also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input can be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
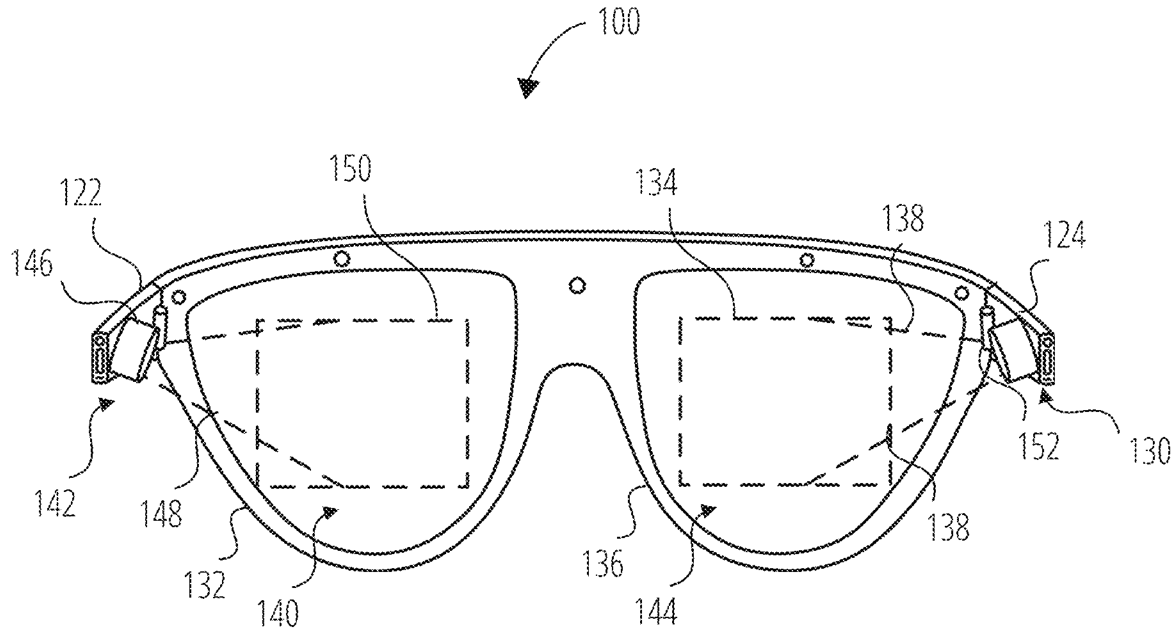
FIG. 1B illustrates a further view of the head-wearable apparatus of FIG. 1A, according to some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world environment seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world environment seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world environment view of the user including display of a user interface to the user of the head-wearable apparatus 100.

It will be appreciated however that other display technologies or configurations can be utilized within an optical engine to display an image to a user in the user's field of view. For example, instead of a projector and a waveguide, an LCD, LED or other display panel or surface can be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 240 illustrated in FIG. 2), and/or hand movements, locations, and positions recognized by the head-wearable apparatus 100.

In some examples, an optical engine of an XR system is incorporated into a lens that is in contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Figure 2:
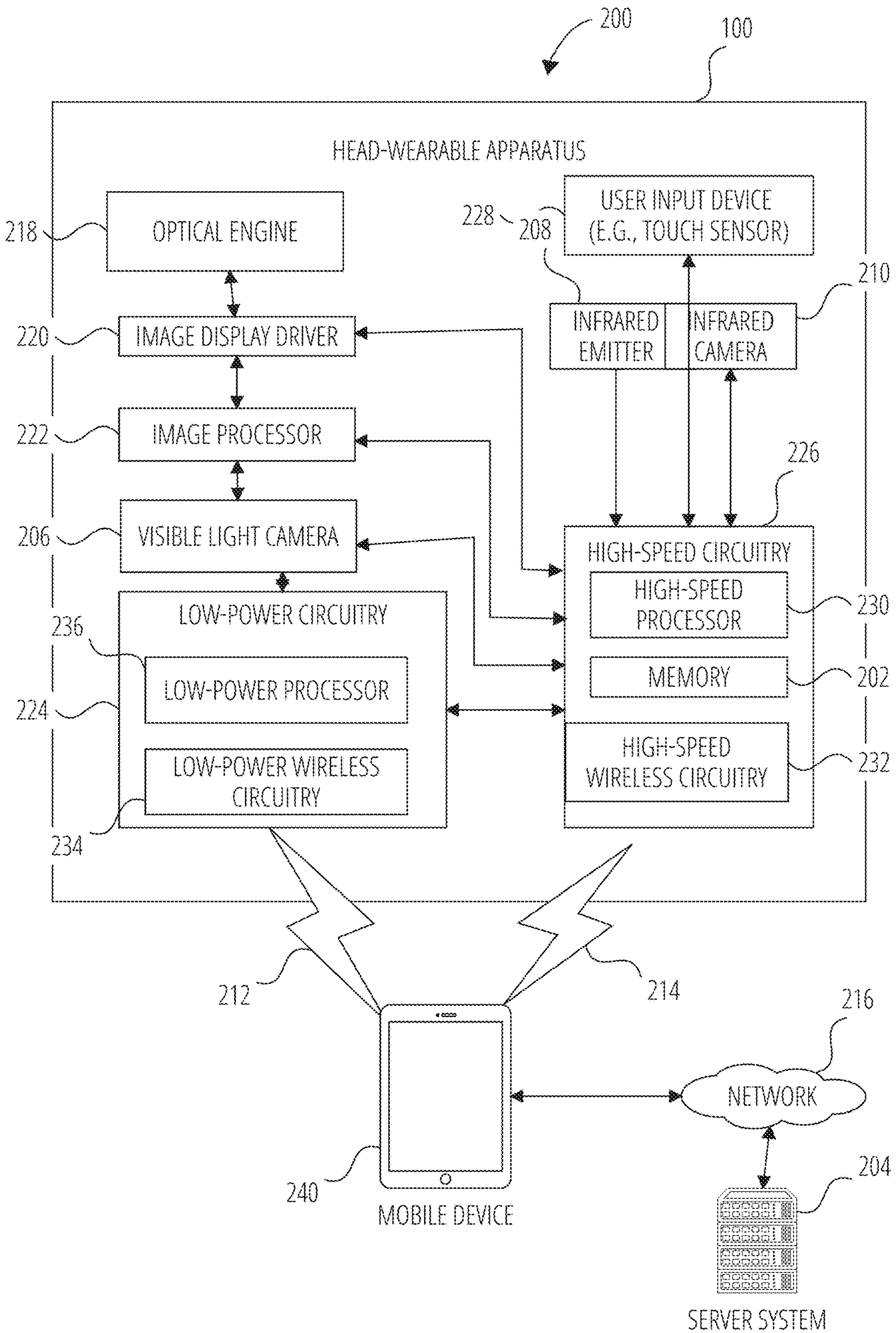
FIG. 2 illustrates a system in which the head-wearable apparatus is operably connected to a mobile device, according to some examples.

FIG. 2 illustrates a system 200 including a head-wearable apparatus 100 with a selector input device, according to some examples. FIG. 2 is a high-level functional block diagram of an example head-wearable apparatus 100 communicatively coupled to a mobile device 240 and various server systems 204 via various.

The head-wearable apparatus 100 includes one or more cameras, each of which can be, for example, a visible light camera 206, an infrared emitter 208, and an infrared camera 210.

The mobile device 240 connects with head-wearable apparatus 100 using both a low-power wireless connection 212 and a high-speed wireless connection 214. The mobile device 240 is also connected to the server system 204 and the networks 216.

The head-wearable apparatus 100 further includes one or more image displays of the optical engine 218. The optical engines 218 include one associated with the left lateral side and one associated with the right lateral side of the head-wearable apparatus 100. The head-wearable apparatus 100 also includes an image display driver 220, an image processor 222, low-power circuitry 224, and high-speed circuitry 226. The optical engine 218 is for presenting images and videos, including an image that can include a graphical user interface to a user of the head-wearable apparatus 100.

The image display driver 220 commands and controls the optical engine 218. The image display driver 220 can deliver image data directly to the optical engine 218 for presentation or can convert the image data into a signal or data format suitable for delivery to the image display device. For example, the image data can be video data formatted according to compression formats, such as H.264 (MPEG-4 Part 10), HEVC, Theora, Dirac, RealVideo RV40, VP8, VP9, or the like, and still image data can be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 228 (e.g., touch sensor or push button), including an input surface on the head-wearable apparatus 100. The user input device 228 (e.g., touch sensor or push button) is to receive from the user an input selection to manipulate the graphical user interface of the presented image.

The components shown in FIG. 2 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right visible light cameras 206 can include digital camera elements such as a complementary metal oxide-semiconductor (CMOS) image sensor, charge-coupled device, camera lenses, or any other respective visible or light-capturing elements that can be used to capture data, including images of scenes with unknown objects.

The head-wearable apparatus 100 includes a memory 202, which stores instructions to perform a subset, or all the functions described herein. The memory 202 can also include storage device.

As shown in FIG. 2, the high-speed circuitry 226 includes a high-speed processor 230, a memory 202, and high-speed wireless circuitry 232. In some examples, the image display driver 220 is coupled to the high-speed circuitry 226 and operated by the high-speed processor 230 to drive the left and right image displays of the optical engine 218. The high-speed processor 230 can be any processor capable of managing high-speed communications and operation of any general computing system needed for the head-wearable apparatus 100. The high-speed processor 230 includes processing resources needed for managing high-speed data transfers on a high-speed wireless connection 214 to a wireless local area network (WLAN) using the high-speed wireless circuitry 232. In certain examples, the high-speed processor 230 executes an operating system such as a LINUX operating system or other such operating system of the head-wearable apparatus 100, and the operating system is stored in the memory 202 for execution. In addition to any other responsibilities, the high-speed processor 230 executing a software architecture for the head-wearable apparatus 100 is used to manage data transfers with high-speed wireless circuitry 232. In certain examples, the high-speed wireless circuitry 232 is configured to implement Institute of Electrical and Electronic Engineers (IEEE) 802.11 communication standards, also referred to herein as WI-FI®. In some examples, other high-speed communications standards can be implemented by the high-speed wireless circuitry 232.

The low-power wireless circuitry 234 and the high-speed wireless circuitry 232 of the head-wearable apparatus 100 can include short-range transceivers (e.g., Bluetooth™, Bluetooth LE, Zigbee, ANT+) and wireless wide, local, or wide area Network transceivers (e.g., cellular or WI-FI®). Mobile device 240, including the transceivers communicating via the low-power wireless connection 212 and the high-speed wireless connection 214, can be implemented using details of the architecture of the head-wearable apparatus 100, as can other elements of the network 216.

The memory 202 includes any storage device capable of storing various data and applications, including, among other things, camera data generated by the left and right visible light cameras 206, the infrared camera 210, and the image processor 222, as well as images generated for display by the image display driver 220 on the image displays of the optical engine 218. While the memory 202 is shown as integrated with high-speed circuitry 226, in some examples, the memory 202 can be an independent standalone element of the head-wearable apparatus 100. In certain such examples, electrical routing lines can provide a connection through a chip that includes the high-speed processor 230 from the image processor 222 or the low-power processor 236 to the memory 202. In some examples, the high-speed processor 230 can manage addressing of the memory 202 such that the low-power processor 236 will boot the high-speed processor 230 any time that a read or write operation involving memory 202 is needed.

As shown in FIG. 2, the low-power processor 236 or high-speed processor 230 of the head-wearable apparatus 100 can be coupled to the camera (visible light camera 206, infrared emitter 208, or infrared camera 210), the image display driver 220, the user input device 228 (e.g., touch sensor or push button), and the memory 202.

The head-wearable apparatus 100 is connected to a host computer. For example, the head-wearable apparatus 100 is paired with the mobile device 240 via the high-speed wireless connection 214 or connected to the server system 204 via the network 216. The server system 204 can be one or more computing devices as part of a service or network computing system, for example, that includes a processor, a memory, and network communication interface to communicate over the network 216 with the mobile device 240 and the head-wearable apparatus 100.

The mobile device 240 includes a processor and a Network communication interface coupled to the processor. The Network communication interface allows for communication over the network 216, low-power wireless connection 212, or high-speed wireless connection 214. The mobile device 240 can further store at least portions of the instructions in the memory of the mobile device 240 memory to implement the functionality described herein.

Output components of the mobile device 240 include visual components, such as a display such as a liquid crystal display (LCD), a plasma display panel (PDP), a light-emitting diode (LED) display, a projector, or a waveguide. The image displays of the optical assembly are driven by the image display driver 220. The output components of the mobile device 240 further include acoustic components (e.g., speakers), haptic components (e.g., a vibratory motor), other signal generators, and so forth. The input components of the mobile device 240, the mobile device 240, and server system 204, such as the user input device 228, can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 can also include additional peripheral device elements. Such peripheral device elements can include sensors and display elements integrated with the head-wearable apparatus 100. For example, peripheral device elements can include any I/O components including output components, motion components, position components, or any other such elements described herein.

In some examples, the head-wearable apparatus 100 can include biometric components or sensors to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components can include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, including:

- Electroencephalography (EEG) based BMIs, which record electrical activity in the brain using electrodes placed on the scalp.
- Invasive BMIs, which used electrodes that are surgically implanted into the brain.
- Optogenetics BMIs, which use light to control the activity of specific nerve cells in the brain.

Any biometric data collected by the biometric components is captured and stored with only user approval and deleted on user request, and in accordance with applicable laws. Further, such biometric data can be used for very limited purposes, such as identification verification. To ensure limited and authorized use of biometric information and other personally identifiable information (PII), access to this data is restricted to authorized personnel only, if at all. Any use of biometric data can strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude can be derived), orientation sensor components (e.g., magnetometers), and the like. Such positioning system coordinates can also be received over low-power wireless connections 212 and high-speed wireless connection 214 from the mobile device 240 via the low-power wireless circuitry 234 or high-speed wireless circuitry 232.

Figure 3:
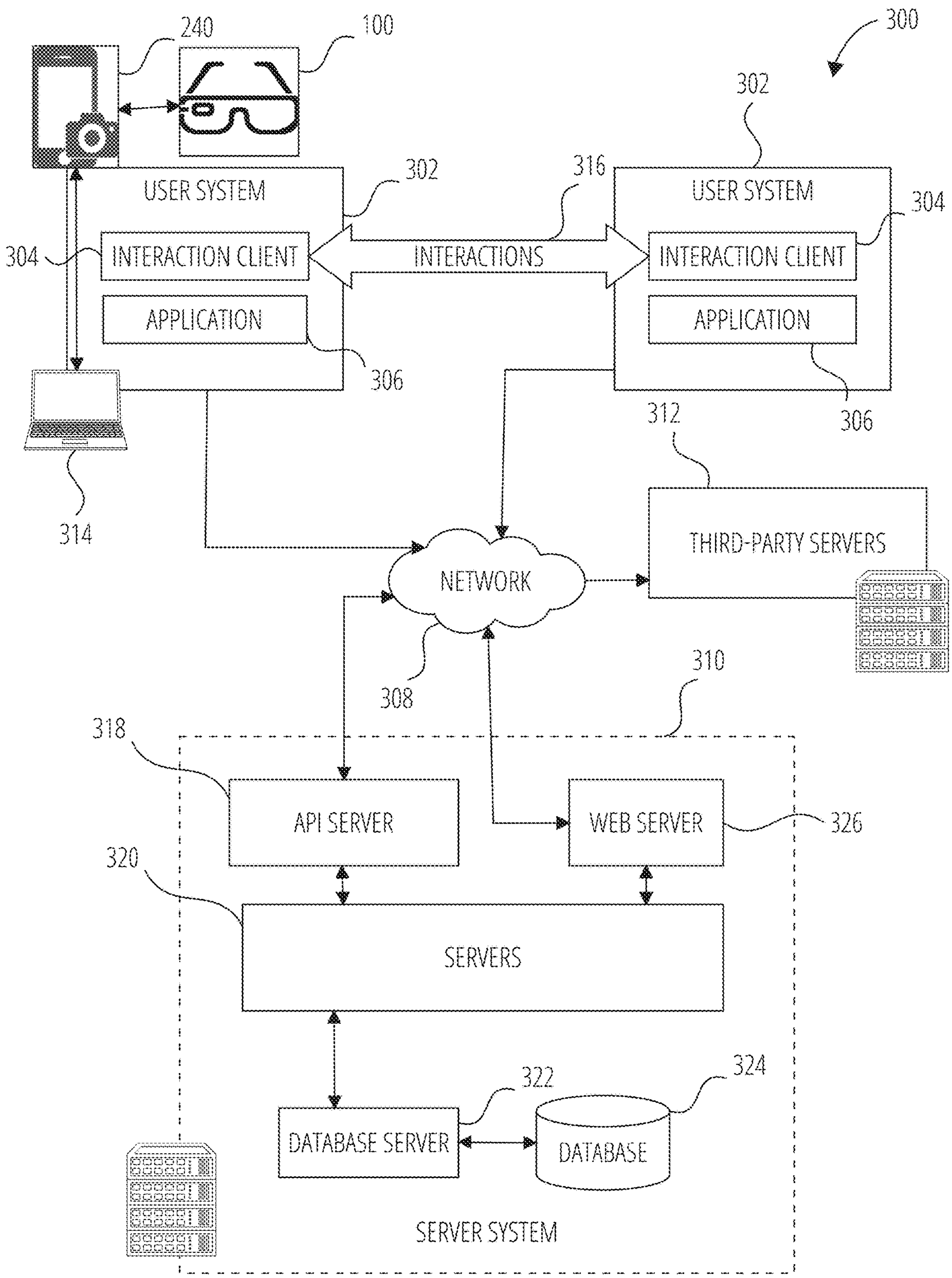
FIG. 3 illustrates a networked environment, according to some examples.

FIG. 3 is a block diagram showing an example digital interaction system 300 for facilitating interactions and engagements (e.g., exchanging text messages, conducting text audio and video calls, or playing games) over a network. The digital interaction system 300 includes multiple user systems 302, each of which hosts multiple applications, including an interaction client 304 and other applications 306. Each interaction client 304 is communicatively coupled, via one or more networks including a network 308 (e.g., the Internet), to other instances of the interaction client 304 (e.g., hosted on respective other user systems), a server system 310 and third-party servers 312). An interaction client 304 can also communicate with locally hosted applications 306 using Applications Program Interfaces (APIs).

Each user system 302 can include multiple user devices, such as a mobile device 240, head-wearable apparatus 100, and a computer client device 314 that are communicatively connected to exchange data and messages.

An interaction client 304 interacts with other interaction clients 304 and with the server system 310 via the network 308. The data exchanged between the interaction clients 304 (e.g., interactions 316) and between the interaction clients 304 and the server system 310 includes functions (e.g., commands to invoke functions) and payload data (e.g., text, audio, video, or other multimedia data).

The server system 310 provides server-side functionality via the network 308 to the interaction clients 304. While certain functions of the digital interaction system 300 are described herein as being performed by either an interaction client 304 or by the server system 310, the location of certain functionality either within the interaction client 304 or the server system 310 can be a design choice. For example, it can be technically preferable to initially deploy particular technology and functionality within the server system 310 but to later migrate this technology and functionality to the interaction client 304 where a user system 302 has sufficient processing capacity.

The server system 310 supports various services and operations that are provided to the interaction clients 304. Such operations include transmitting data to, receiving data from, and processing data generated by the interaction clients 304. This data can include message content, client device information, geolocation information, digital effects (e.g., media augmentation and overlays), message content persistence conditions, entity relationship information, and live event information. Data exchanges within the digital interaction system 300 are invoked and controlled through functions available via user interfaces (UIs) of the interaction clients 304.

Turning now specifically to the server system 310, an Application Program Interface (API) server 318 is coupled to and provides programmatic interfaces to servers 320, making the functions of the servers 320 accessible to interaction clients 304, other applications 306 and third-party server 312. The servers 320 are communicatively coupled to a database server 322, facilitating access to a database 324 that stores data associated with interactions processed by the servers 320. Similarly, a web server 326 is coupled to the servers 320 and provides web-based interfaces to the servers 320. To this end, the web server 326 processes incoming network requests over the Hypertext Transfer Protocol (HTTP) and several other related protocols.

The Application Program Interface (API) server 318 receives and transmits interaction data (e.g., commands and message payloads) between the servers 320 and the user systems 302 (and, for example, interaction clients 304 and other application 306) and the third-party server 312. Specifically, the Application Program Interface (API) server 318 provides a set of interfaces (e.g., routines and protocols) that can be called or queried by the interaction client 304 and other applications 306 to invoke functionality of the servers 320. The Application Program Interface (API) server 318 exposes various functions supported by the servers 320, including account registration; login functionality; the sending of interaction data, via the servers 320, from a particular interaction client 304 to another interaction client 304; the communication of media files (e.g., images or video) from an interaction client 304 to the servers 320; the settings of a collection of media data (e.g., a narrative); the retrieval of a list of friends of a user of a user system 302; the retrieval of messages and content; the addition and deletion of entities (e.g., friends) to an entity relationship graph; the location of friends within an entity relationship graph; and opening an application event (e.g., relating to the interaction client 304).

The interaction client 304 provides a user interface that allows users to access features and functions of an external resource, such as a linked application 306, an applet, or a microservice. This external resource can be provided by a third party or by the creator of the interaction client 304.

The external resource can be a full-scale application installed on the user's system 302, or a smaller, lightweight version of the application, such as an applet or a microservice, hosted either on the user's system or remotely, such as on third-party servers 312 or in the cloud. These smaller versions, which include a subset of the full application's features, can be implemented using a markup-language document and can also incorporate a scripting language and a style sheet.

When a user selects an option to launch or access the external resource, the interaction client 304 determines whether the resource is web-based or a locally installed application. Locally installed applications can be launched independently of the interaction client 304, while applets and microservices can be launched or accessed via the interaction client 304.

If the external resource is a locally installed application, the interaction client 304 instructs the user's system to launch the resource by executing locally stored code. If the resource is web-based, the interaction client 304 communicates with third-party servers to obtain a markup-language document corresponding to the selected resource, which it then processes to present the resource within its user interface.

The interaction client 304 can also notify users of activity in one or more external resources. For instance, it can provide notifications relating to the use of an external resource by one or more members of a user group. Users can be invited to join an active external resource or to launch a recently used but currently inactive resource.

The interaction client 304 can present a list of available external resources to a user, allowing them to launch or access a given resource. This list can be presented in a context-sensitive menu, with icons representing different applications, applets, or microservices varying based on how the menu is launched by the user.

Figure 4:
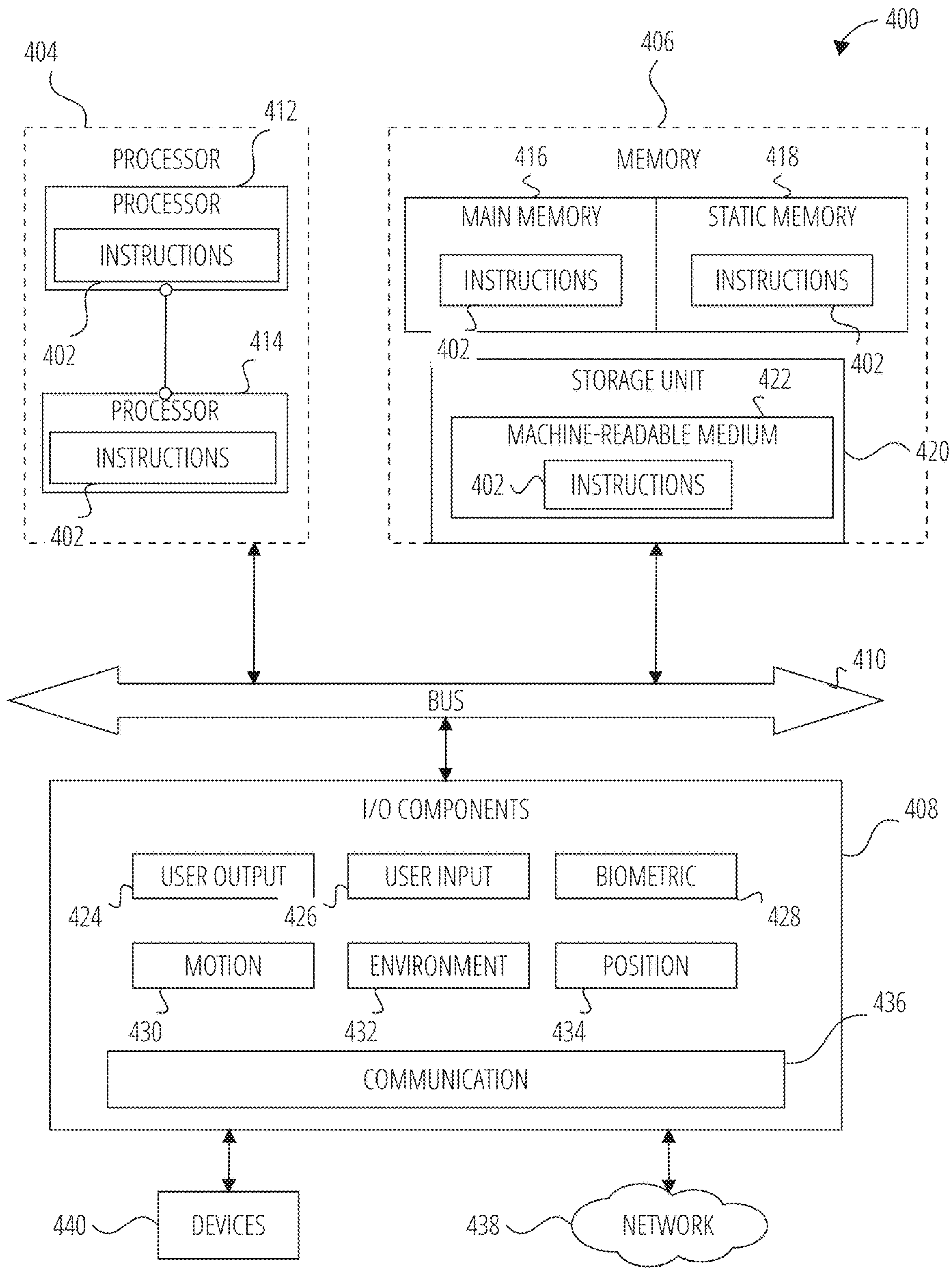
FIG. 4 is a diagrammatic representation of a machine in the form of a computer system, according to some examples.

FIG. 4 is a diagrammatic representation of the machine 400 within which instructions 402 (e.g., software, a program, an application, an applet, an app, or other executable code) for causing the machine 400 to perform any one or more of the methodologies discussed herein can be executed. For example, the instructions 402 can cause the machine 400 to execute any one or more of the methods described herein. The instructions 402 transform the general, non-programmed machine 400 into a particular machine 400 programmed to carry out the described and illustrated functions in the manner described. The machine 400 can operate as a standalone device or can be coupled (e.g., networked) to other machines. In a networked deployment, the machine 400 can operate in the capacity of a server machine or a client machine in a server-client network environment, or as a peer machine in a peer-to-peer (or distributed) network environment. The machine 400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 402, sequentially or otherwise, that specify actions to be taken by the machine 400. Further, while a single machine 400 is illustrated, the term "machine" shall also be taken to include a collection of machines that individually or jointly execute the instructions 402 to perform any one or more of the methodologies discussed herein. The machine 400, for example, can comprise the user system 302 or any one of multiple server devices forming part of the server system 310. In some examples, the machine 400 can also comprise both client and server systems, with certain operations of a particular method or algorithm being performed on the server-side and with certain operations of the method or algorithm being performed on the client-side.

The machine 400 can include one or more hardware processors 404, memory 406, and input/output I/O components 408, which can be configured to communicate with each other via a bus 410.

The processor 404 can comprise one or more processors such as, but not limited to, processor 412 and processor 414. The one or more processors can comprise one or more types of processing systems such as, but not limited to, Central Processing Units (CPUs), Graphics Processing Units (GPUs), Digital Signal Processors (DSPs), Neural Processing Units (NPUs) or AI Accelerators, Physics Processing Units (PPUs), Field-Programmable Gate Arrays (FPGAs), Multi-core Processors, Symmetric Multiprocessing (SMP) Systems, and the like.

The memory 406 includes a main memory 416, a static memory 418, and a storage unit 420, both accessible to the processor 404 via the bus 410. The main memory 406, the static memory 418, and storage unit 420 store the instructions 402 embodying any one or more of the methodologies or functions described herein. The instructions 402 can also reside, completely or partially, within the main memory 416, within the static memory 418, within machine-readable medium 422 within the storage unit 420, within at least one of the processor 404 (e.g., within the processor's cache memory), or any suitable combination thereof, during execution thereof by the machine 400.

The I/O components 408 can include a wide variety of components to receive input, provide output, produce output, transmit information, exchange information, capture measurements, and so on. The specific I/O components 408 that are included in a particular machine will depend on the type of machine. For example, portable machines such as mobile phones can include a touch input device or other such input mechanisms, while a headless server machine will likely not include such a touch input device. It will be appreciated that the I/O components 408 can include many other components that are not shown in FIG. 4. In various examples, the I/O components 408 can include user output components 424 and user input components 426. The user output components 424 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 426 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 408 can include biometric components 428, motion components 430, environmental components 432, or position components 434, among a wide array of other components. For example, the biometric components 428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components can include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request, and in accordance with applicable laws. Further, such biometric data can be used for very limited purposes, such as identification verification. To ensure limited and authorized use of biometric information and other Personally Identifiable Information (PII), access to this data is restricted to authorized personnel only, if at all. Any use of biometric data can strictly be limited to identification verification purposes, and the data is not shared or sold to any third party without the explicit consent of the user. In addition, appropriate technical and organizational measures are implemented to ensure the security and confidentiality of this sensitive information.

The motion components 430 include acceleration sensor components (e.g., accelerometer), gravitation sensor components, rotation sensor components (e.g., gyroscope).

The environmental components 432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment.

With respect to cameras, the user system 302 can have a camera system comprising, for example, front cameras on a front surface of the user system 302 and rear cameras on a rear surface of the user system 302. The front cameras can, for example, be used to capture still images and video of a user of the user system 302 (e.g., "selfies"), which can then be modified with digital effect data (e.g., filters) described above. The rear cameras can, for example, be used to capture still images and videos in a more traditional camera mode, with these images similarly being modified with digital effect data. In addition to front and rear cameras, the user system 302 can also include a 360° camera for capturing 360° photographs and videos.

Moreover, the camera system of the user system 302 can be equipped with advanced multi-camera configurations. This can include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 302 can also feature triple, quad, or even penta camera configurations on both the front and rear sides of the user system 302. These multiple cameras systems can include a wide camera, an ultra-wide camera, a telephoto camera, a macro camera, and a depth sensor, for example.

Communication can be implemented using a wide variety of technologies. The I/O components 408 further include communication components 436 operable to couple the machine 400 to a Network 438 or devices 440 via respective coupling or connections. For example, the communication components 436 can include a network interface component or another suitable device to interface with the Network 438. In further examples, the communication components 436 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 440 can be another machine or any of a wide variety of peripheral devices (e.g., a peripheral device coupled via a USB).

Moreover, the communication components 436 can detect identifiers or include components operable to detect identifiers. For example, the communication components 436 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information can be derived via the communication components 436, such as location via Internet Protocol (IP) geolocation, location via Wi-Fi® signal triangulation, location via detecting an NFC beacon signal that can indicate a particular location, and so forth.

The various memories (e.g., main memory 416, static memory 418, and memory of the processor 404) and storage unit 420 can store one or more sets of instructions and data structures (e.g., software) embodying or used by any one or more of the methodologies or functions described herein. These instructions (e.g., the instructions 402), when executed by processor 404, cause various operations to implement the disclosed examples.

The instructions 402 can be transmitted or received over the Network 438, using a transmission medium, via a network interface device (e.g., a network interface component included in the communication components 436) and using any one of several well-known transfer protocols (e.g., hypertext transfer protocol (HTTP)). Similarly, the instructions 402 can be transmitted or received using a transmission medium via a coupling (e.g., a peer-to-peer coupling) to the devices 440.

Figure 5:
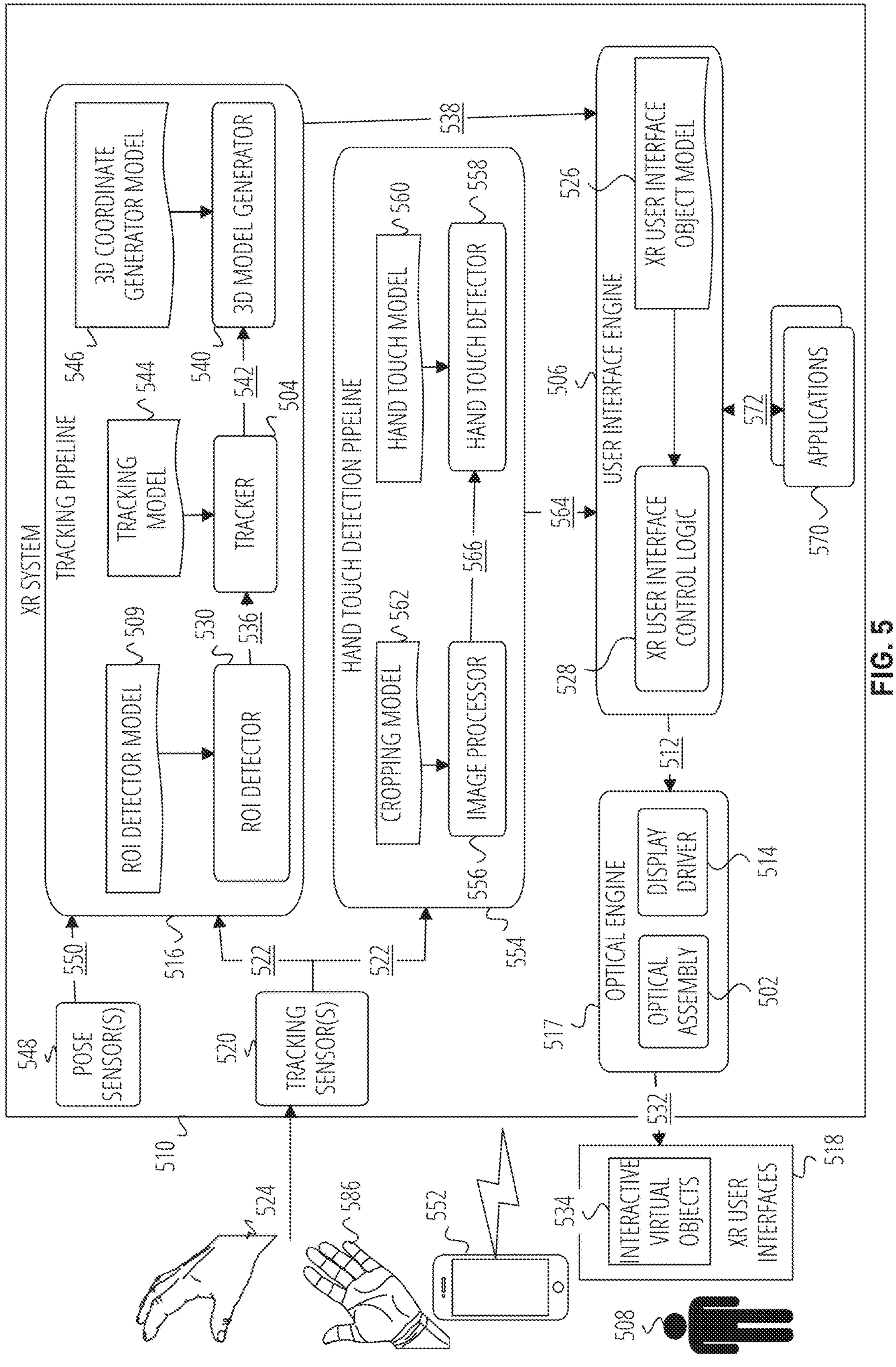
FIG. 5 illustrates a collaboration diagram of components of an XR system, according to some examples.

FIG. 5 illustrates a collaboration diagram of components of an XR system 510, such as head-wearable apparatus 100 of FIG. 1A, using hand-tracking for user input, according to some examples.

The XR system 510 uses 3D tracking data 538 and hand touch data 564 to provide continuous real-time input modalities to a user 508 of the XR system 510 where the user 508 interacts with one or more XR user interfaces 518 using hand-tracking and hand touch input modalities. Using the hand-tracking and hand touch input modalities, the XR system 510 generates user interface input/output (UI I/O) data 572 that are used by one or more applications 570 to generate one or more XR user interfaces 518.

The applications 570 are applications that are executed by the XR system 510 and generate XR user interfaces that provide features such as, but not limited to, maintenance guides, interactive maps, interactive tour guides, tutorials, and the like. The applications 570 can also be entertainment applications such as, but not limited to, video games, interactive videos, and the like.

For example, a user interface engine 506 includes XR user interface control logic 528 comprising a dialog script or the like that specifies a user interface dialog implemented by the XR user interfaces 518. The XR user interface control logic 528 also comprises one or more actions that are to be taken by the XR system 510 based on detecting various dialog events such as user inputs input by the user 508 using the XR user interfaces 518 and by making hand gestures. The user interface engine 506 further includes an XR user interface object model 526. The XR user interface object model 526 includes 3D coordinate data of the one or more interactive virtual objects 534 of the one or more XR user interfaces 518. The XR user interface object model 526 also includes 3D graphics data of the one or more interactive virtual objects 534. The 3D graphics data is used by an optical engine 517 to generate the XR user interfaces 518 for display to the user 508.

The user interface engine 506 generates XR user interface data 512 using the XR user interface object model 526. The XR user interface data 512 includes image data of the one or more interactive virtual objects 534 of the XR user interfaces 518. The user interface engine 506 communicates the XR user interface data 512 to a display driver 514 of an optical engine 517 of the XR system 510. The display driver 514 receives the XR user interface data 512 and generates display control signals using the XR user interface data 512. The display driver 514 uses the display control signals to control the operations of one or more optical assemblies 502 of the optical engine 517. In response to the display control signals, the one or more optical assemblies 502 generate an XR user interface graphics display 532 of the XR user interfaces 518 that are provided to the user 508.

While in use, the XR system 510 uses one or more tracking sensors 520 to detect and record a position, orientation, and gestures of the hands 524 and 586 of the user 508. This can involve capturing the speed and trajectory of hand movements, recognizing specific hand poses, and determining the relative positioning of the hands in the three-dimensional space of an XR environment.

In some examples, the one or more tracking sensors 520 comprise an array of optical sensors capable of capturing a wide range of hand movements and gestures in real-time as images. These sensors can include Red Green and Blue (RGB) cameras that capture images of the hands 524 and hand 586 of the user 508 using light having a broad wavelength spectrum, such as natural light provided by the real-world environment or artificial illumination created by one or more incandescent lamps, LED lamps, or the like provided by the XR system 510. In some examples, the one or more tracking sensors 520 can include infrared cameras that capture images of the hands 524 and 586 of the user 508 using energy in the infrared radiation (IR) spectrum. The IR energy can be supplied by one or more IR emitters of the XR system 510.

In some examples, the one or more tracking sensors 520 comprise depth-sensing cameras that utilize structured light or time-of-flight technology to create a three-dimensional model of the hands 524 and 586 of the user 508. This allows the XR system 510 to detect intricate gestures and finger movements with high accuracy.

In some examples, the one or more tracking sensors 520 comprise ultrasonic sensors that emit sound waves and measure the reflection off the hands 524 and 586 of the user 508 to determine their location and movement in space.

In some examples, the one or more tracking sensors 520 comprise electromagnetic field sensors that track the movement of the hands 524 and 586 of the user 508 by detecting changes in an electromagnetic field generated around the user 508.

In some examples, the one or more tracking sensors 520 include capacitive sensors embedded in gloves worn by the user 508. These sensors detect hand movements and gestures based on changes in capacitance caused by finger positioning and orientation.

In some examples, the XR system 510 includes one or more pose sensors 548 such as an Inertial Measurement Unit (IMU) and the like, that track the orientation and movements of the XR system of the user 508. The one or more pose sensors 548 are used to determine Six Degrees of Freedom (6DoF) data of movement of the XR system 510 in three-dimensional space. Specifically, the 6DoF data encompasses three translational movements along the x, y, and z axes (forward/back, up/down, left/right) and three rotational movements (pitch, yaw, roll) included in pose data 550. In the context of XR, 6DoF data is allows for the tracking of both position and orientation of an object or user in 3D space.

In some examples, the one or more pose sensors 548 include one or more cameras that capture images of the real-world environment. The images are included in the pose data 550. The XR system 510 uses the images and photogrammetric methodologies to determine 6DoF data of the XR system 510.

In some examples, the XR system 510 uses a combination of an IMU and one or more cameras to determine 6DoF data for the XR system 510.

The XR system 510 uses a tracking pipeline 516 including a Region Of Interest (ROI) detector 530, a tracker 504, and a 3D model generator 540, to generate the 3D tracking data 538 using the tracking data 522 and the pose data 550.

The ROI detector 530 uses a ROI detector model 509 to detect a region in the real world environment that includes the hands 524 and 586 of the user 508. The ROI detector model 509 is trained to recognize those portions of the real-world environment that include a user's hands as more fully described in reference to FIG. 11A and FIG. 11B. The ROI detector 530 generates ROI data 536 indicating which portions of the tracking data 522 include one or more hands of the user 508 and communicates the ROI data 536 to the tracker 504.

The tracker 504 uses a tracking model 544 to generate 2D tracking data 542. The tracker 504 uses the tracking model 544 to recognize landmark features on portions of the one or both hands 524 and 586 of the user 508 captured in the tracking data 522 and within the ROI identified by the ROI detector 530. The tracker 504 extracts landmarks of the one or both hands 524 and 586 of the user 508 from the tracking data 522 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The tracking model 544 operates on the landmarks to generate the 2D tracking data 542 that includes a sequence of skeletal models of one or more hands of the user 508. The tracking model 544 is trained to generate the 2D tracking data 542 as more fully described in reference to FIG. 11A and FIG. 11B. The tracker communicates the 2D tracking data 542 to the 3D model generator 540.

The 3D model generator 540 receives the 2D tracking data 542 and generates 3D tracking data 538 using the 2D tracking data 542, the pose data 550, and a 3D coordinate generator model 546. For example, the 3D model generator 540 determines a reference position in the real-world environment for the XR system 510. The 3D model generator 540 uses a 3D coordinate generator model 546 that operates on the 2D tracking data 542 to generate the 3D tracking data 538. The 3D coordinate generator model 546 is trained to generate the 3D tracking data 538 as more fully described in reference to FIG. 11A and FIG. 11B.

In some examples, the tracker 504 generates the 3D tracking data 538 using photogrammetry methodologies to create 3D models of the hands of the user 508 from the 2D tracking data 542 by capturing overlapping pictures of the hands of the user 508 from different angles. In some examples, the 2D tracking data 542 includes multiple images taken from different angles, which are then processed to generate the 3D models that are included in the 3D tracking data 538. In some examples, the XR system 510 uses the pose data 550 captured by the one or more pose sensors 548 to determine an angle or position of the XR system 510 as an image is captured of the hands of the user 508.

The XR system 510 uses a hand touch detection pipeline 554 including an image processor 556 and a hand touch detector 558 to generate hand touch data 564 using the tracking data 522.

In some examples, the image processor 556 extracts features from the tracking data 522 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The image processor 556 operates on the features to generate the cropped image data 566. The image processor 556 is trained to generate the cropped image data 566 as more fully described in reference to FIG. 11A and FIG. 11B.

In some examples, images in the tracking data 522 are processed by an image processor 556 to enhance the images for better clarity and contrast, making it easier for the XR system 510 to extract features from the tracking data 522. In some examples, the image processor 556 uses image enhancement methodologies such as, but not limited to: histogram equalization, which adjusts the contrast of an image by redistributing the intensity values; Gaussian smoothing, which reduces noise and detail by averaging pixel values with a Gaussian kernel; unsharp mask filtering, which enhances edges by subtracting a blurred version of the image from the original; Wiener filtering, which removes noise and deblurs images by accounting for both the degradation function and the statistical properties of noise; Contrast-Limited Adaptive Histogram Equalization (CLAHE), which improves local contrast and enhances the definition of edges in an image; median filtering, which reduces noise by replacing each pixel's value with the median value of the intensities in its neighborhood; point operations, which apply the same transformation to each pixel based on its original value, such as intensity transformations; spatial filtering, which involves convolution of the image with a kernel to achieve effects like blurring or sharpening; and the like.

In some examples, the image processor 556 filters the images to remove background noise and enhance the visibility of a portion of a hand of the user and a digit used by the user 508 to make a hand touch. This processing helps the XR system 510 to accurately detect and interpret the specific interactions intended by the user 508. This capability is useful in complex visual environments where background noise could otherwise interfere with the ability of the XR system 510 to correctly detect a hand touch.

The image processor 556 detects portions of images of the tracking data 522 that include image data of the hands 524 and 586 of the user 508 and crops the images to generate cropped image data 566 including the image data of the hands 524 and 586. The image processor 556 generates the cropped image data 566 and communicates the cropped image data 566 to the hand touch detector 558.

In some examples, the image processor 556 uses a cropping model 562 to crop the images of the tracking data 522 that include image data of the hands 524 and 586. Training of the cropping model 562 more fully described in reference to FIG. 11A and FIG. 11B.

In some examples, the image processor 556 uses a hand tracking process to isolate a palmar surface or a hand dorsal surface in images of the hands 524 and 586 of the user 508. This process is useful for focusing the analysis on the most relevant part of a palmar surface or a hand dorsal surface for interaction, which enhances the ability of the XR system 510 to accurately detect and interpret user inputs. By isolating the palmar surface or hand dorsal surface, the XR system 510 can more effectively process and respond to gestures and touches, improving the overall user experience in XR applications. This targeted processing helps in reducing noise and distractions from other parts of the hand or background, improving the precision and reliability of the hand touch detection.

In some examples, the image processor 556 uses the hand tracking process to crop an image to isolate an area around a tip of a digit being used by the user 508 to make a hand touch.

In some examples, the image processor 556 adjusts the cropping of the cropped images to enhance features indicative of the hand touch. This adjustment is useful for improving the accuracy of hand touch detection by focusing on specific areas of the image where hand touch interactions are most likely to occur. By enhancing these features, the XR system 510 can more effectively interpret user inputs, leading to a more responsive and intuitive user experience within the XR environment. This capability is particularly useful for applications requiring precise control and interaction, such as virtual reality gaming or complex navigational tasks in augmented reality settings.

Figure 6:
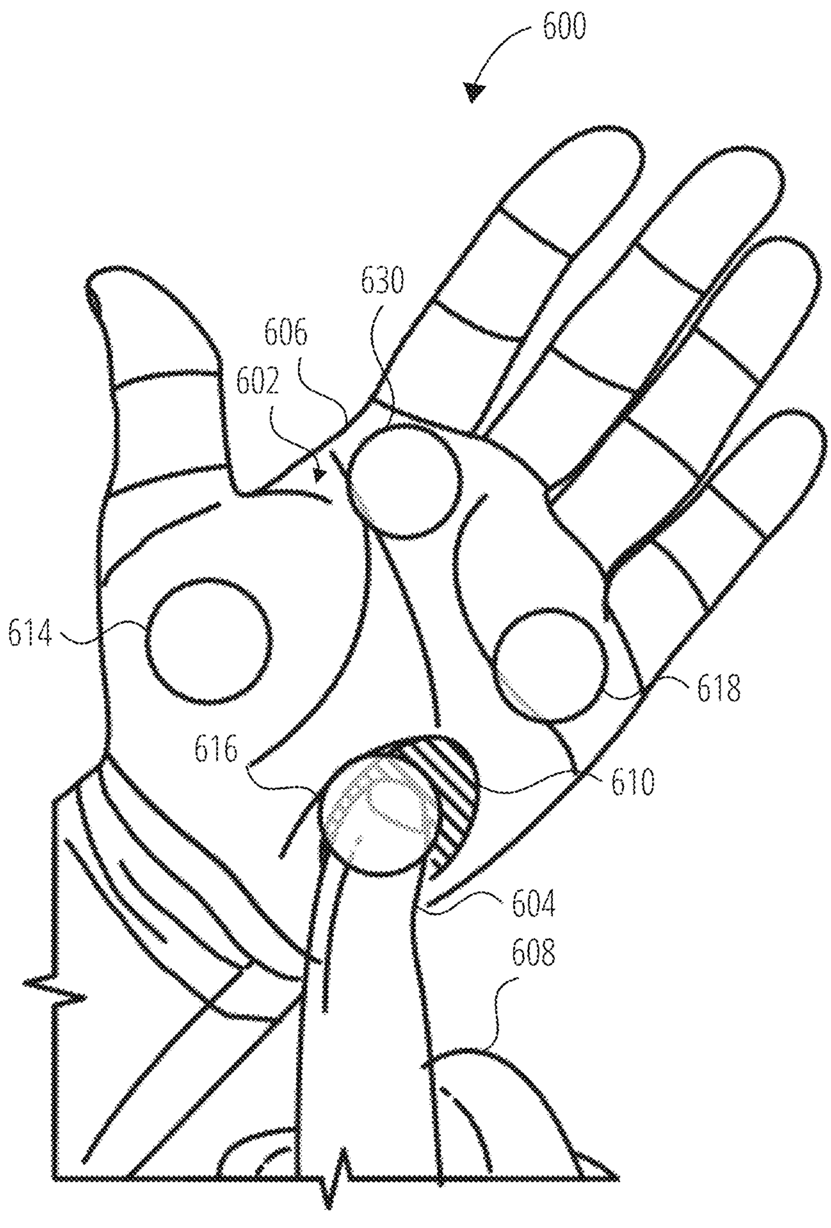
FIG. 6 illustrates a palmar hand-located XR user interface, according to some examples.

The hand touch detector 558 uses a hand touch model 560 to generate the hand touch data 564. The hand touch detector 558 uses the hand touch model 560 to recognize when the user 508 touches a portion of a first one of their hands 524 and 586 using one or more digits of a second one of their hands 524 and 586. FIG. 6 illustrates a hand touch event of a palmar surface 602 of a first hand 606 of a user by a digit 604 of a second hand 608 of the user. As shown, the digit 604 pressing against the palmar surface 602 generates a deformation 610 in a surface of the palmar surface 602 that can be detected using the image data of the palmar surface 602.

In some examples, the portion of the hand being touched is the palmar surface of the non-dominant hand of the user and the one or more digits are one or more digits of the dominant hand of the user.

In some examples, the portion of the hand being touched is the hand dorsal surface of the non-dominant hand of the user and the one or more digits are one or more digits of the dominant hand of the user.

In some examples, the portion of the hand being touched is the palmar surface of the dominant hand of the user and the one or more digits are one or more digits of the non-dominant hand of the user.

In some examples, the portion of the hand being touched is the hand dorsal surface of the dominant hand of the user and the one or more digits are one or more digits of the non-dominant hand of the user.

When a hand touch is detected by the hand touch detection pipeline 554, the hand touch detection pipeline 554 communicates hand touch data 564 including data of the hand touch to the user interface engine 506.

Figure 11A:
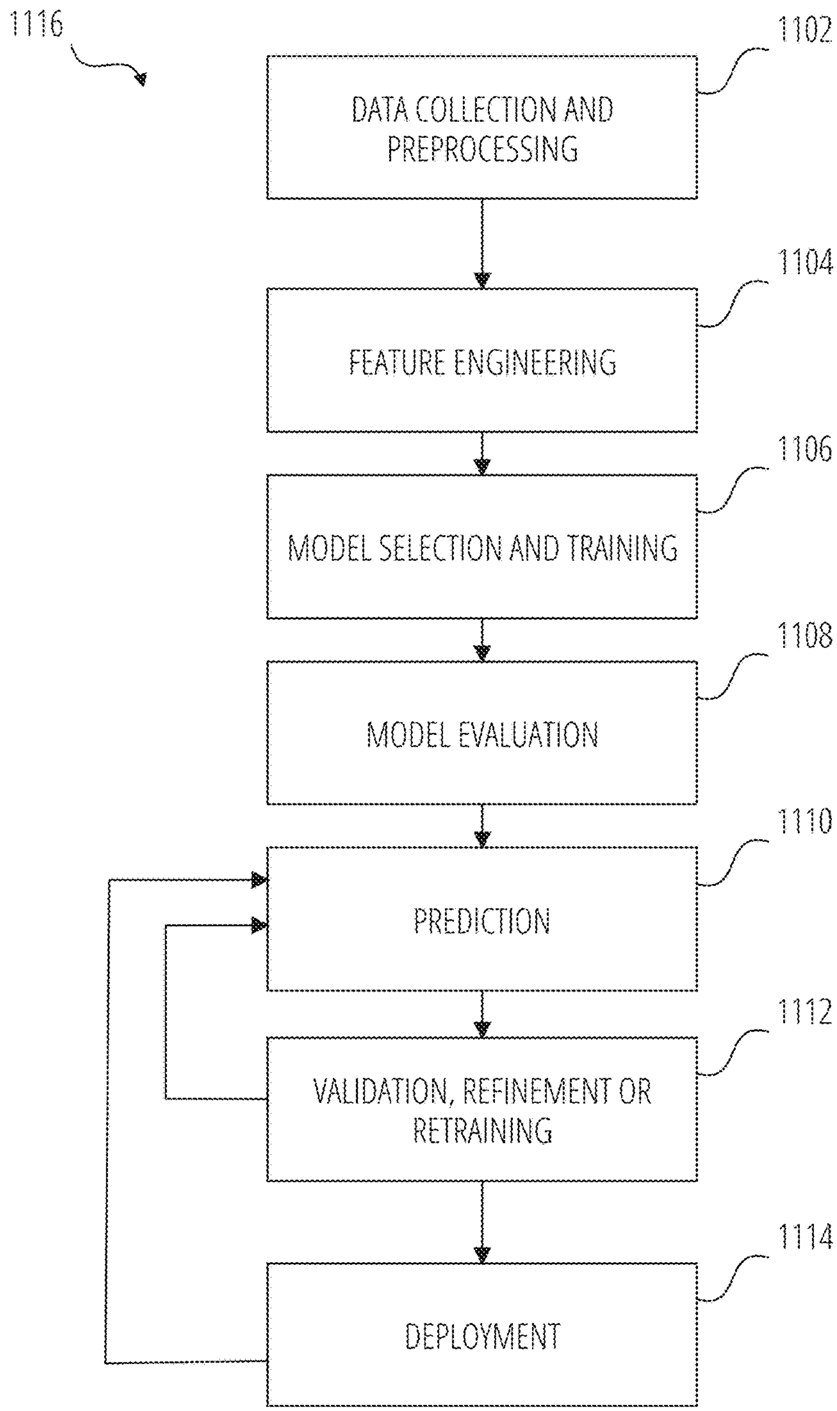
FIG. 11A illustrates a machine-learning pipeline, according to some examples.
Figure 11B:
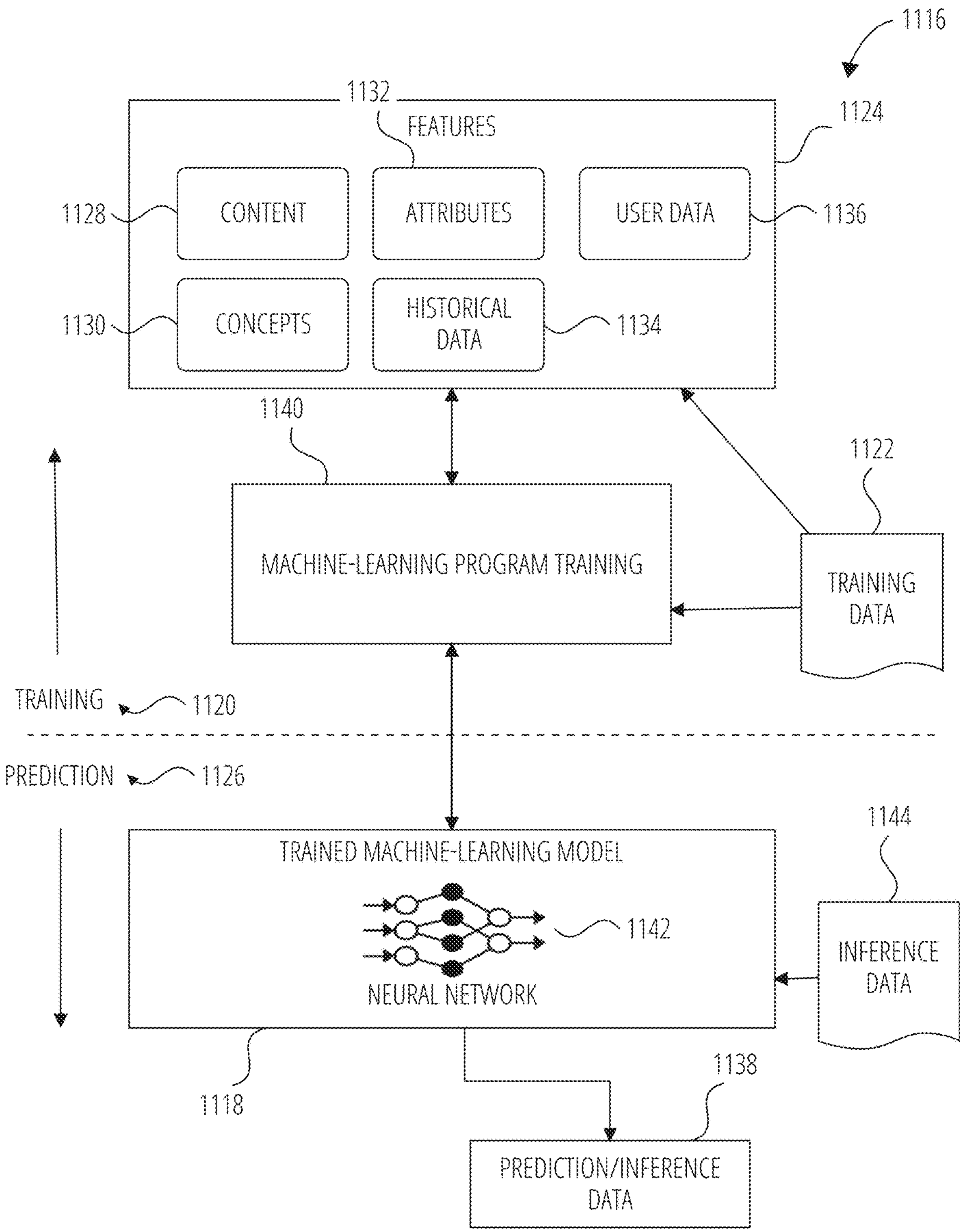
FIG. 11B illustrates training and use of a machine-learning program, according to some examples.

The hand touch model 560 is trained to generate the hand touch data 564 as more fully described in reference to FIG. 11A, and FIG. 11B.

In some examples, the hand touch model 560 is retrained using a training data collected by the XR system as the XR system prompts the user 508 to perform specific operations such as, but not limited to, holding a digit over a palm of one their hands, palm touching specific portions of their palm, and the like. This retraining process is useful for personalizing the model to the specific characteristics and preferences of the user 508. By incorporating user-specific data, the XR system 510 can enhance hand touch accuracy and responsiveness to a user's unique way of interacting with the XR system 510. This capability is particularly beneficial in applications where user comfort and customization improve the overall experience, such as in personalized virtual assistance or adaptive gaming environments.

In some examples, the hand touch detection sensitivity of the hand touch detection pipeline 554 is calibrated using a set of individual hand characteristics of the user 508. This calibration process is useful for tailoring the system's sensitivity to the unique physical attributes of the user's hands, such as size, shape, and touch pressure tendencies.

In some examples, detecting a hand touch of a hand surface by a digit of a hand includes interpolating between different hand touch pressure levels detected in the cropped images. For example, the hand touch detector 558 uses the hand touch model 560 to detect variations in visual cues such as, but not limited to, shadowing, indentation, skin deformation, and the like, which are captured in the cropped images. By interpolating these subtle differences, the XR system 510 can determine not just the presence of a touch, but also the varying degrees of pressure applied. In some examples, the hand touch detector 558 generates data of a hand touch that includes a continuous parameter that has a value representing states of a hand touch from a hover state to a hard press state. As an example, the continuous value can be a real number having a range from 0.0 to 2.0 where 0.0 represents a hover of a digit over a palm, 1.0 represents a light pressure hand touch, and 2.0 represents a heavy pressure hand touch, and a value between 0.0 and 1.0 represents a distance between the digit and the palm without a hand touch corresponding to the user 508 holding their digit 604 just above their palmar surface 602 in a hover position.

In some examples, the one or more tracking sensors 520 include one or more visible light cameras such as, but not limited to, RGB cameras, that capture the images of the hands 524 of user 508. The cropped images are processed by the image processor 556 to emphasize depth cues visible in the hands 524 of the user in the RGB spectrum. This processing is useful for enhancing the visual information used for accurately interpreting hand movements and interactions within the XR environment. By emphasizing depth cues, the XR system 510 can more effectively discern the spatial relationships and gestures of the user's hands, leading to more precise and responsive interactions in virtual and augmented reality applications.

In some examples, the XR system 510 is operably connected to a mobile device 552. The user 508 can use the mobile device 552 to configure the XR system 510. In some examples, the mobile device 552 functions as an alternative input modality.

In some examples, an XR system performs the functions of the tracking pipeline 516, the hand touch detection pipeline 554, the user interface engine 506, and the optical engine 517 utilizing various APIs and system libraries.

FIG. 6 illustrates a palmar hand-located XR user interface 600, according to some examples. An XR system, such as XR system 510 of FIG. 5, uses the palmar hand-located XR user interface 600 to provide a hand-located user input modality to a user 508 of FIG. 5 of the XR system 510. To do so, the XR system 510 uses the user interface engine 506 of FIG. 5 to generate the palmar hand-located XR user interface 600 as more fully described in reference to FIG. 5. As illustrated in FIG. 6, the palmar hand-located XR user interface 600 includes one or more interactive virtual objects such as interactive virtual object 614, interactive virtual object 630, interactive virtual object 618, and interactive virtual object 630. 3D location data of the interactive virtual objects of the palmar hand-located XR user interface 600 are stored in the XR user interface object model 526 of FIG. 5.

In some examples, the one or more interactive virtual objects are displayed to user 508 in association with a specified location of the palmar surface 602 of a first hand 606 of the user 508. For example, an interactive virtual object can be displayed in association with specific fleshy portions of the palmar surface 602 of the first hand 606 such as, but not limited to, the thenar eminence at the thumb base, the hypothenar eminence at the little finger side of the palmar surface 602, one or more interdigital spaces between fingers, and the like.

Interactive virtual object 614, interactive virtual object 616, interactive virtual object 618, and interactive virtual object 630 are displayed to the user 508 overlaid on the palmar surface 602 of the first hand 606 of the user 508. The user 508 interacts with the interactive virtual object 614, interactive virtual object 616, interactive virtual object 618, and interactive virtual object 630 by touching a palmar surface 602 of their palm with a digit 604 of a second hand 608 to a portion of the palmar surface 602 that corresponds to an apparent location on their palm of the interactive virtual object 614, interactive virtual object 616, interactive virtual object 618, or interactive virtual object 630. As the palmar surface 602 is touched by the digit 604, a deformation 610 is formed in a fleshy part of the palm that can be detected as a hand touch at the location on the palmar surface 602 associated with a location of an interactive object, such as interactive virtual object 616.

In some examples, interactive virtual object 614, interactive virtual object 616, interactive virtual object 618, and interactive virtual object 630 are displayed on a non-dominant hand of the user and the user uses one or more digits of their dominant hand to touch the palm of the non-dominant hand.

In some examples, interactive virtual object 614, interactive virtual object 616, interactive virtual object 618, and interactive virtual object 630 are displayed on a dominant hand of the user and the user uses one or more digits of their non-dominant hand to touch the palm of the dominant hand.

The XR system 510 captures images including images of the first hands 606 and 608. For example, the XR system 510 utilizes one or more cameras included in the one or more tracking sensors 520 of the XR system 510 to capture tracking data 522. The tracking data 522 includes images of the first hand 606 and second hand 608 of the user 508 as the user 508 interacts with the XR user interfaces 518. For example, the XR system 510 uses the hand touch detector 558 of FIG. 5 to detect the hand touch of the palmar surface 602 of the first hand 606 by the digit 604 of the second hand 608 using the hand touch model 560 of FIG. 5 as more fully described in reference to FIG. 5.

The XR system 510 provides the detected hand touch of the palmar surface 602 of the user 508 as an input into the XR user interfaces 518 provided to the user 508. For example, hand touch data 564 including data of the hand touch by the digit 604 to the palmar surface 602 of the first hand 606 is communicated to the user interface engine 506 by the hand touch detection pipeline 554. Simultaneously, 3D tracking data 538 including data of the 3D location of the first hand 606 including the palmar surface 602, and the digit 604 is communicated to the user interface engine 506 by the tracking pipeline 516. The user interface engine 506 receives the hand touch data 564 from the hand touch detection pipeline 554 and the 3D tracking data 538 from the tracking pipeline 516. The user interface engine 506 uses the data of the hand touch to the palmar surface 602, the data of the 3D location of the first hand 606 including the palmar surface 602, and the data of the 3D location of interactive virtual object 614, interactive virtual object 616, interactive virtual object 618, and interactive virtual object 630 stored in the XR user interface object model 526 to determine if the user 508 has touched their palm at a location that corresponds to a location of one or more of the interactive virtual objects 614, 616, 618, and 630. In response to determining that the user 508 has touched their palm a location that corresponds to a location of one or more of the interactive virtual objects 614, 616, 618, and 630, the user interface engine 506 determines that the user 508 has selected and is interacting with the determined interactive virtual object.

In some examples, the palmar hand-located XR user interface 600 can be invoked using one or more gestures by a user. For example, the user may close a hand into a fist, turn their fist palm up, and then open the fist such that the palm is pointing up. The XR system 510 detects this sequence of gestures and generates the palmar hand-located XR user interface 600 associated with the hand used by the user to make the sequence of one or more gestures.

In some examples, a size of the interactive virtual objects as rendered and provided to a user and a size of the respective areas on the palmar surface 602 associated with the interactive virtual objects are scaled in proportion to a size of the first hand 606. This scaling ensures that the interactive elements are appropriately sized relative to the user's hand dimensions, enhancing the ergonomic and intuitive use of the user interface. This proportional scaling aids in maintaining usability and comfort, ensuring that the virtual objects are neither too small to interact with effectively nor too large to cause awkwardness or reduce the functional area of the palm.

For example, the XR system 510 uses one or more sensors to capture the physical dimensions of the first hand 606, specifically focusing on the palmar surface 602. The XR system 510 measures aspects such as the width, length, and curvature of the palmar surface 602, which are used for accurate scaling. Based on the captured dimensions, the XR system 510 calculates scaling factors for the interactive virtual objects. These factors are determined to provide that the size of each virtual object is proportional to the size of the first hand 606, providing a consistent and ergonomic user experience. The scaling factors can consider the overall hand size and specific zones on the palmar surface 602 where the interactive virtual objects will be displayed. Using the scaling factors, the XR system 510 adjusts the dimensions of the interactive virtual objects. This adjustment provides that the interactive virtual objects are neither too large to overlap uncomfortably over the palm nor too small to be difficult to interact with.

In some examples, the XR system 510 measures the distance between two specific landmarks on the user's hand, such as a wrist landmark, a middle knuckle landmark, or the like, using the 3D tracking data 538 obtained from the one or more tracking sensors 520. This measurement is used for accurately determining the scale of the interactive virtual objects of the hand-located XR user interface. Once the distance is measured, XR system 510 adjusts the size of the interactive virtual objects accordingly. This adjustment ensures that the size of the interactive virtual objects is appropriately scaled to fit the dimensions of the first hand 606, thereby improving the usability and effectiveness of the palmar hand-located XR user interface 600. This method allows for a tailored user experience, adapting the interface dynamically to suit individual anatomical variations.

In some examples, XR system 510 dynamically adjusts the sizing of the interactive virtual objects based on their placement on the user's palm. The resizing involves not just the location of the interactive virtual objects but also the alteration of their radius. This adjustment includes modifying the radius of a circle that intersects all of the interactive virtual objects, allowing each interactive virtual objects to either increase or decrease in size. This method ensures that the interactive virtual objects are appropriately scaled in relation to each other and to the user's hand size, In some examples, XR system 510 uses a quantization step of a fixed interval to systematically adjust the sizes of the interactive virtual objects. In an example, the XR system 510 calculates the size increments in steps of 0.4. For instance, if the minimum size is set at 2.2, the next size would increase by 0.4 to 2.6, and subsequent sizes would continue to increase by 0.4, such as 3.0, ensuring a consistent and proportional scaling.

In some examples, the XR system 510 dynamically resizes the interactive virtual objects based on real-time measurements, accommodating variations in user hand sizes.

The appropriately scaled interactive virtual objects are then rendered on the palmar surface 602 of the first hand 606 within the XR environment. The rendering process considers the visual and tactile feedback necessary for interaction, providing for the display of the interactive virtual objects at optimal sizes for touch interaction and visual recognition.

In some examples, the user closes the palmar hand-located XR user interface 600 by making a gesture with the first hand 606 associated with the palmar hand-located XR user interface 600. For example, the user makes a fist with the first hand 606 associated with the palmar hand-located XR user interface 600. The XR system 510 detects the closing of the first hand 606 into a fist and the XR system 510 closes the palmar hand-located XR user interface 600.

In some examples, the palmar hand-located XR user interface 600 located on the palmar surface 602 provides a tactile physical feedback, enhancing user interaction through tactile responses. This tactile interaction offers a more satisfying experience compared to mid-air gestures, because use of the palmar hand-located XR user interface 600 involves direct physical contact by the user with the palmar surface 602. Such contact is not only more intuitive but also reinforces the user's actions by providing immediate physical sensations.

In some examples, the sensation of pressing interactive virtual objects located on the palmar surface 602 confirms user actions without the need for visual cues, which is particularly advantageous in XR environments. In these XR environments, users often have to split their visual attention between virtual and real-world elements. The tactile feedback from the palmar hand-located XR user interface 600 aids in reducing cognitive load and enhancing the overall interaction efficiency, ensuring that users can operate the system confidently even without constant visual confirmation.

In some examples, the ergonomic location of interactive virtual objects on the palmar surface 602 of the first hand 606 is designed to optimize accessibility and comfort. This includes strategically positioning buttons along the edges of the palmar surface 602.

Such placement is chosen to align with natural hand movements and ease of access, enhancing the overall user experience.

In some examples, the design of the palmar hand-located XR user interface 600 intentionally avoids placing buttons in sensitive or ticklish areas of the hand, such as the center of the palm or near the wrist, to prevent discomfort or involuntary reactions during use. Instead, interactive virtual objects are positioned in areas that are less sensitive yet remain easily accessible for pressing.

In some examples, the design of the palmar hand-located XR user interface 600 utilizes the concept of proprioception, which is the user's innate awareness of their body's position and movement. By integrating the interactive virtual objects on the palmar surface 602, the palmar hand-located XR user interface 600 allows users to interact with the palmar hand-located XR user interface 600 intuitively and without the need to visually confirm each action. This design choice reduces cognitive load and enhances usability, making the interaction both efficient and user-friendly.

Figure 7:
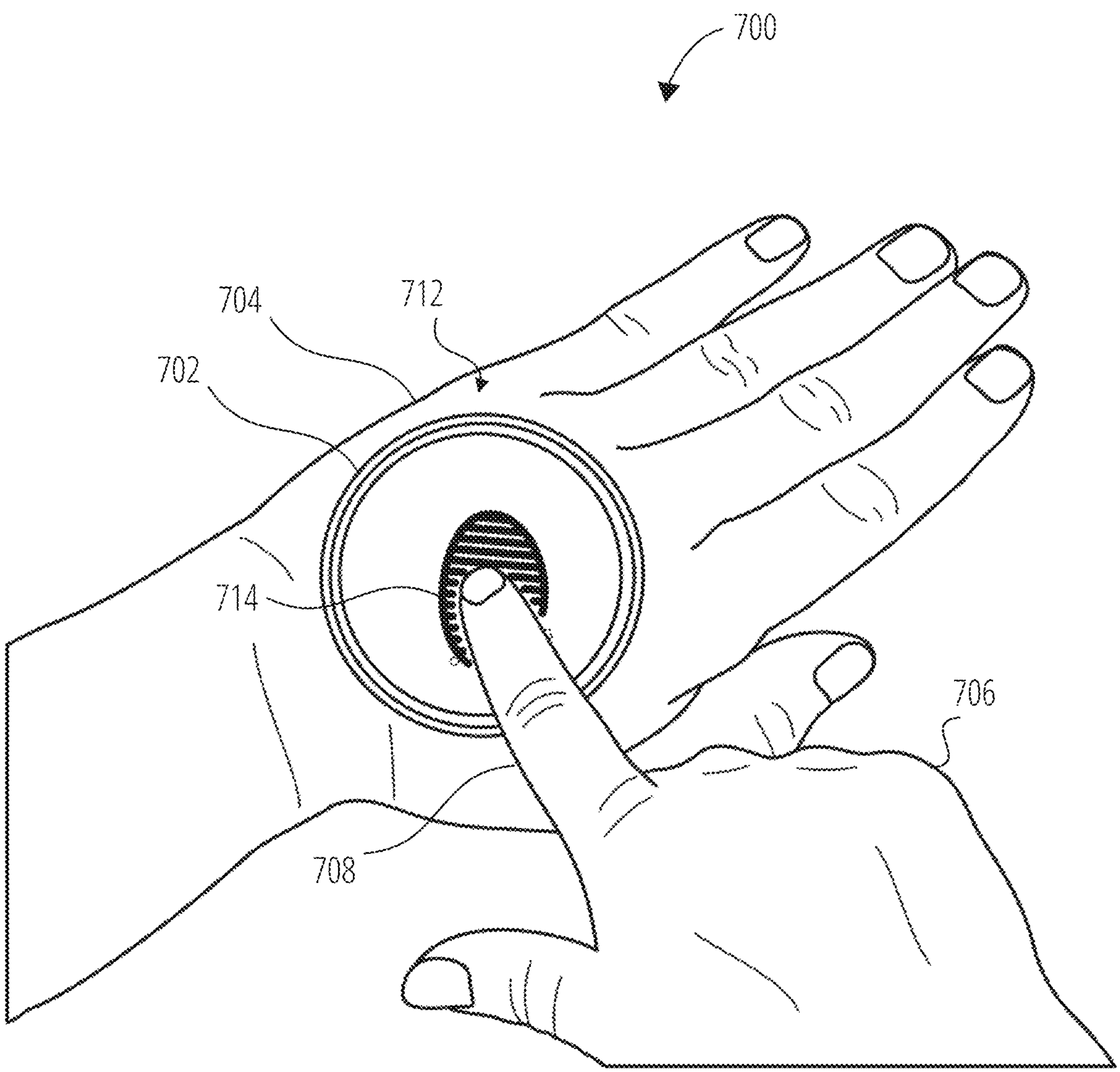
FIG. 7 illustrates a dorsal hand-located XR user interface, according to some examples.

FIG. 7 illustrates a back of hand or dorsal hand-located XR user interface 700, according to some examples. An XR system 510 of FIG. 5 uses the dorsal hand-located XR user interface 700 to provide a hand-located user input modality to a user 508 of FIG. 5. To do so, the XR system 510 uses the user interface engine 506 of FIG. 5 to generate the dorsal hand-located XR user interface 700 as a component of the XR user interfaces 518 as more fully described in reference to FIG. 5. The dorsal hand-located XR user interface 700 includes one or more interactive virtual objects including interactive virtual object 702. 3D location data of the interactive virtual objects of the dorsal hand-located XR user interface 700 are stored in the XR user interface object model 526.

In some examples, the one or more interactive virtual objects are displayed to the user in association with a specified location of the hand dorsal surface 712 of the first hand 704 of the user 508. The user 508 interacts with the interactive virtual object 702 by touching the hand dorsal surface 712 with a digit 708 of a second hand 706 to a portion of the hand dorsal surface 712 that corresponds to an apparent location on the hand dorsal surface 712 of the interactive virtual object 702. As the hand dorsal surface 712 is touched by the digit 708, a deformation 714 is formed on the hand dorsal surface 712 that can be detected as a hand touch at the location of an interactive virtual object, such as the interactive virtual object 702.

In some examples, the interactive virtual object 702 is displayed on a non-dominant hand of the user and the user uses one or more digits of their dominant hand to touch the hand dorsal surface of the non-dominant hand.

In some examples, the interactive virtual object 702 is displayed on a dominant hand of the user and the user uses one or more digits of their non-dominant hand to touch the hand dorsal surface of the dominant hand.

As the user 508 touches the hand dorsal surface 712, the XR system 510 captures images including images of the first hand 704 and second hand 706. For example, the XR system 510 utilizes one or more cameras included in the one or more tracking sensors 520 of the XR system 510 to capture tracking data 522. The tracking data 522 includes images of the first hand 704 and second hand 706 of the user 508 as the user 508 interacts with the XR user interfaces 518. The XR system 510 uses the hand touch detector 558 of FIG. 5 to detect the hand touch of the hand dorsal surface 712 of the first hand 606 by the digit 708 of the second hand 706 using the hand touch model 560 of FIG. 5 as more fully described in reference to FIG. 5. The XR system 510 provides the detected hand touch of the hand dorsal surface 712 at the location of the interactive virtual object 702 as an input into the XR user interfaces 518 provided to the user 508.

For example, hand touch data 564 including data of the hand touch by the digit 708 to the hand dorsal surface 712 of the first hand 704 is communicated to the user interface engine 506 by the hand touch detection pipeline 554. Simultaneously, 3D tracking data 538 including data of the 3D location of the first hand 704 including the hand dorsal surface 712, and the digit 708 is communicated to the user interface engine 506 by the tracking pipeline 516. The user interface engine 506 receives the hand touch data 564 from the hand touch detection pipeline 554 and the 3D tracking data 538 from the tracking pipeline 516. The user interface engine 506 uses the data of the hand touch to the hand dorsal surface 712, the data of the 3D location of the first hand 704 including the hand dorsal surface 712, and the data of the 3D location of the interactive virtual object 702 to determine if the user 508 has touched the hand dorsal surface 712 at a location that corresponds to a location of the interactive virtual object 702. In response to determining that the user 508 has touched the hand dorsal surface 712 at a location that corresponds to a location of the interactive virtual object 702, the user interface engine 506 determines that the user 508 has selected and is interacting with the determined interactive virtual object.

In some examples, one or more of the interactive virtual objects of the dorsal hand-located XR user interface 700 can be used to programmatically display various status information of the XR system 510. The various status information can include, but is not limited to:

- Battery Level: Shows the current battery status and remaining power percentage, alerting the user when recharging is necessary.
- Network Connectivity: Indicates the status of wireless connections such as Wi-Fi strength, Bluetooth connectivity, and mobile network availability.
- Volume Level: Displays the current volume setting and allows for adjustments to ensure audio levels are suitable for the environment and user preference.
- Brightness Level: Shows the current screen brightness and provides options for adjustment to suit different lighting conditions.
- System Time: Displays the current time, which can be synchronized with internet time servers to ensure accuracy.
- Active User Profile: Indicates which user profile is currently active, especially useful in devices shared among multiple users.
- Memory Usage: Shows the amount of RAM currently in use and the total available, helping users manage system resources effectively.
- Storage Space: Displays the used and available storage space, aiding in data management and application installation decisions.
- Running Applications: Lists applications that are currently active, allowing users to switch between them or close them as needed.
- System Notifications: Provides alerts about system events, updates, or other important information that requires user attention.
- Security Status: Informs about the security level of the device, including any breaches, firewall status, or antivirus updates.

In some examples, the dorsal hand-located XR user interface 700 can be invoked using one or more gestures by a user. For example, the user may turn their first hand 704 so that the hand dorsal surface 712 faces upward and flattens their first hand 704 so that their fingers are extended. The XR system 510 detects this sequence of one or more gestures and generates the dorsal hand-located XR user interface 700 associated with the hand used by the user to make the sequence of one or more gestures.

In some examples, the user closes the dorsal hand-located XR user interface 700 by making a gesture with the first hand 704 associated with the dorsal hand-located XR user interface 700. For example, the user turns their first hand 704 so that the hand dorsal surface 712 is no longer facing upward while also relaxing their fingers. The XR system 510 detects the turning of the first hand 704 and relaxation of the fingers and closes the dorsal hand-located XR user interface 700.

In some examples, the dorsal hand-located XR user interface 700 located on the hand dorsal surface 712 provides a tactile physical feedback, enhancing user interaction through tactile responses. This tactile interaction offers a more satisfying experience compared to mid-air gestures, because use of the dorsal hand-located XR user interface 700 involves direct physical contact by the user with the hand dorsal surface 712 of their own hand. Such contact is not only more intuitive but also reinforces the user's actions by providing immediate physical sensations. In addition, the sensation of pressing interactive virtual objects located on the hand dorsal surface 712 confirms user actions without the need for visual cues, which is particularly advantageous in XR environments. In these XR environments, users often have to split their visual attention between virtual and real-world elements. The tactile feedback from the dorsal hand-located XR user interface 700 aids in reducing cognitive load and enhancing the overall interaction efficiency, ensuring that users can operate an XR system confidently even without constant visual confirmation.

Figure 8:
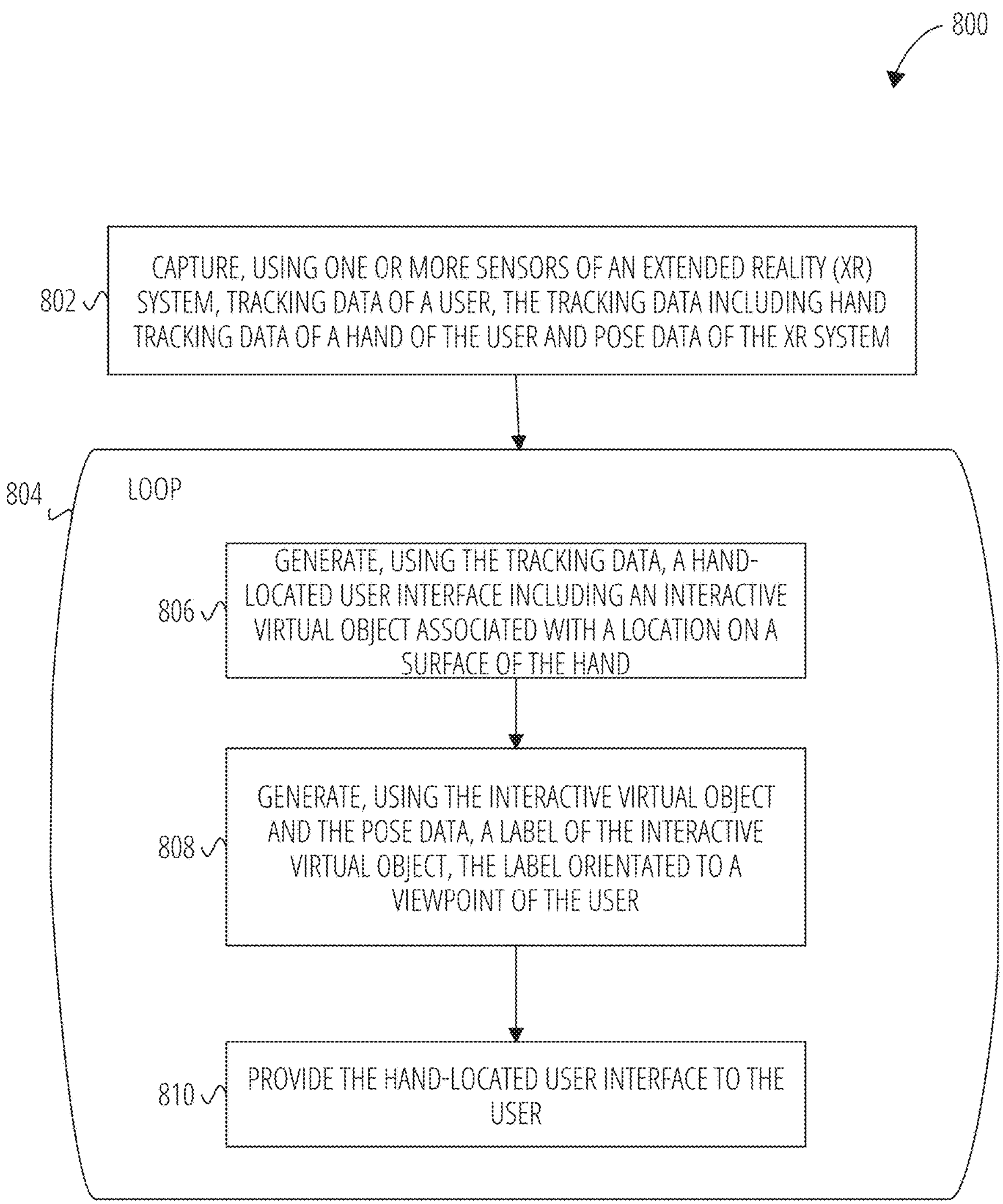
FIG. 8 illustrates a dynamic label method, according to some examples.
Figure 9A:
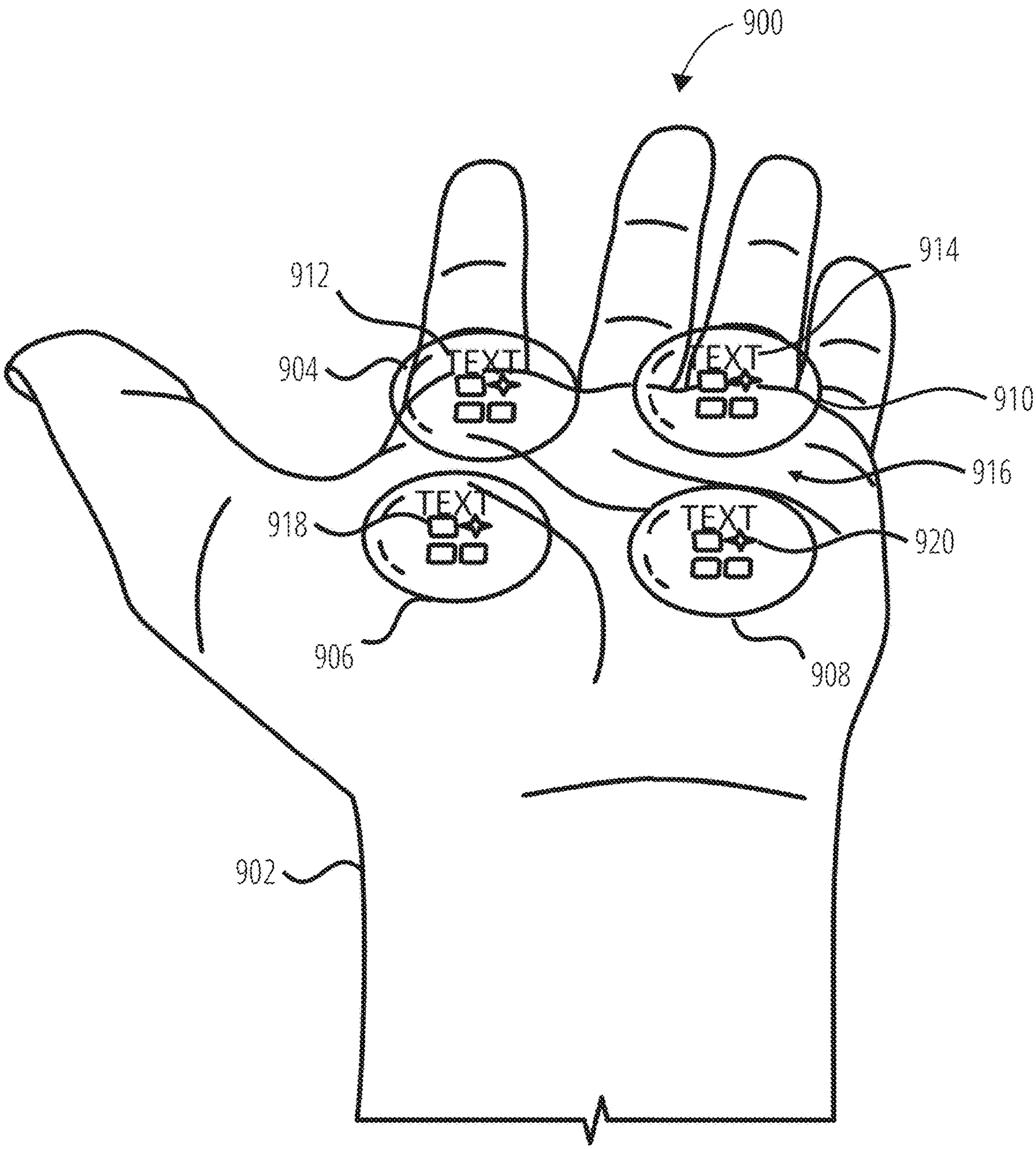
FIG. 9A, FIG. 9B, and FIG. 9C illustrate aspects of a palmar hand-located XR user interface, according to some examples.
Figure 9B:
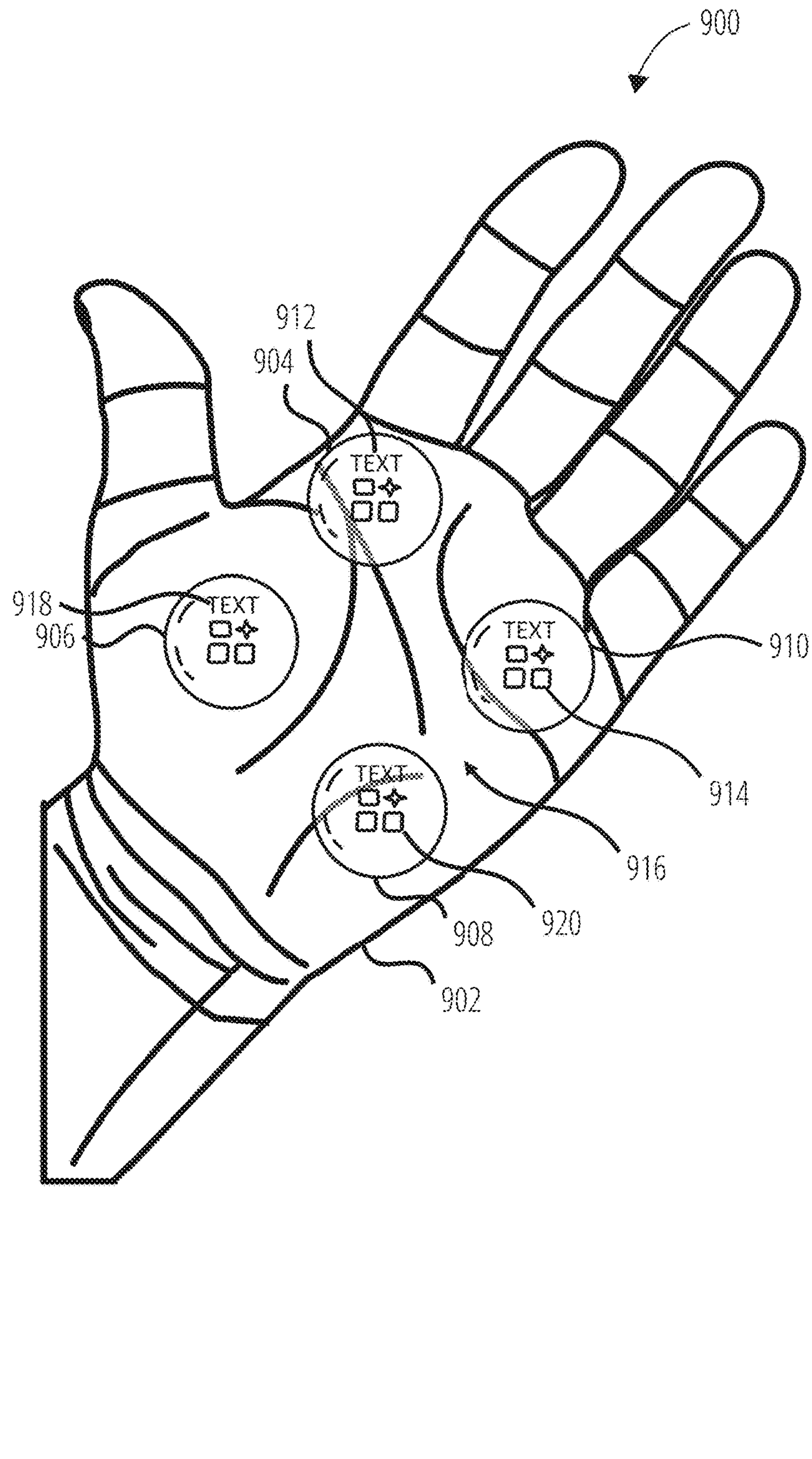
Figure 9C:
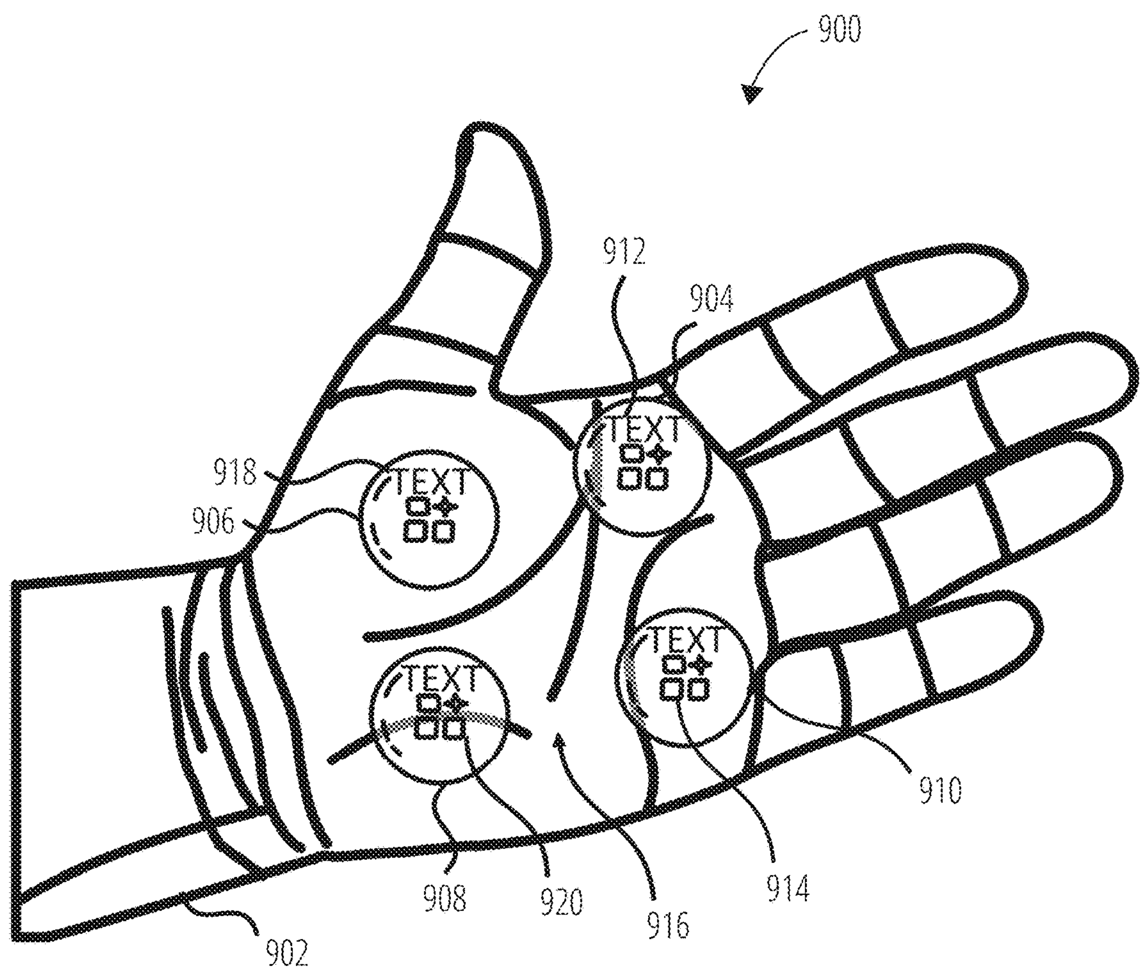
Figure 10A:
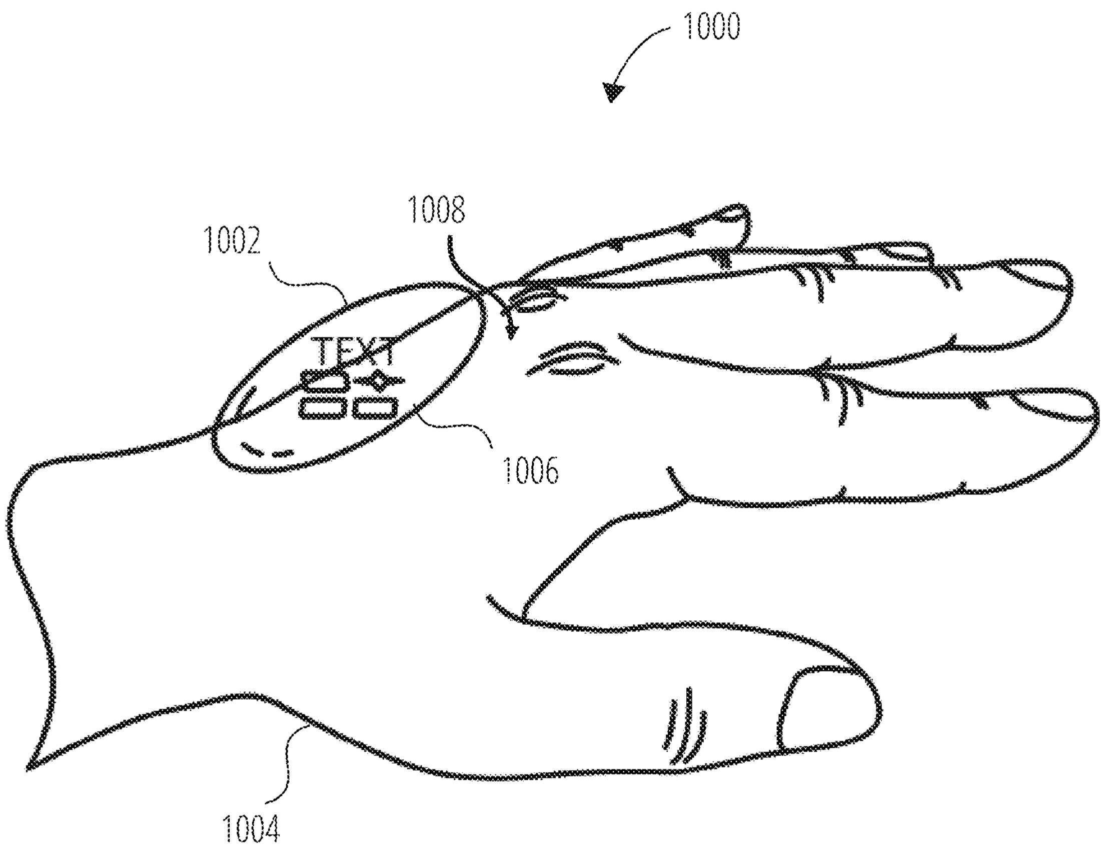
FIG. 10A, FIG. 10B, and FIG. 10C illustrate aspects of a dorsal hand-located XR user interface, according to some examples.
Figure 10B:
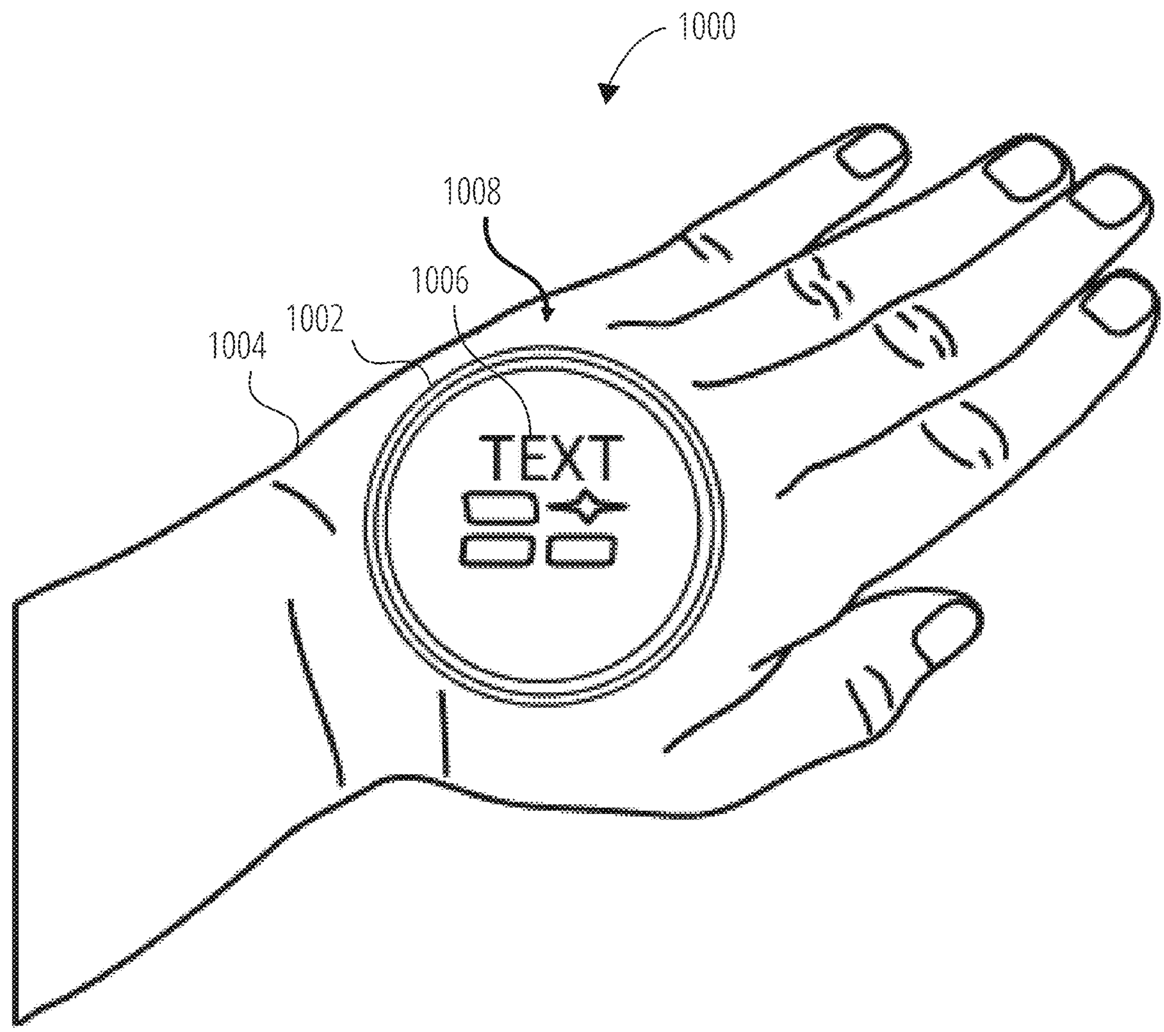
Figure 10C:
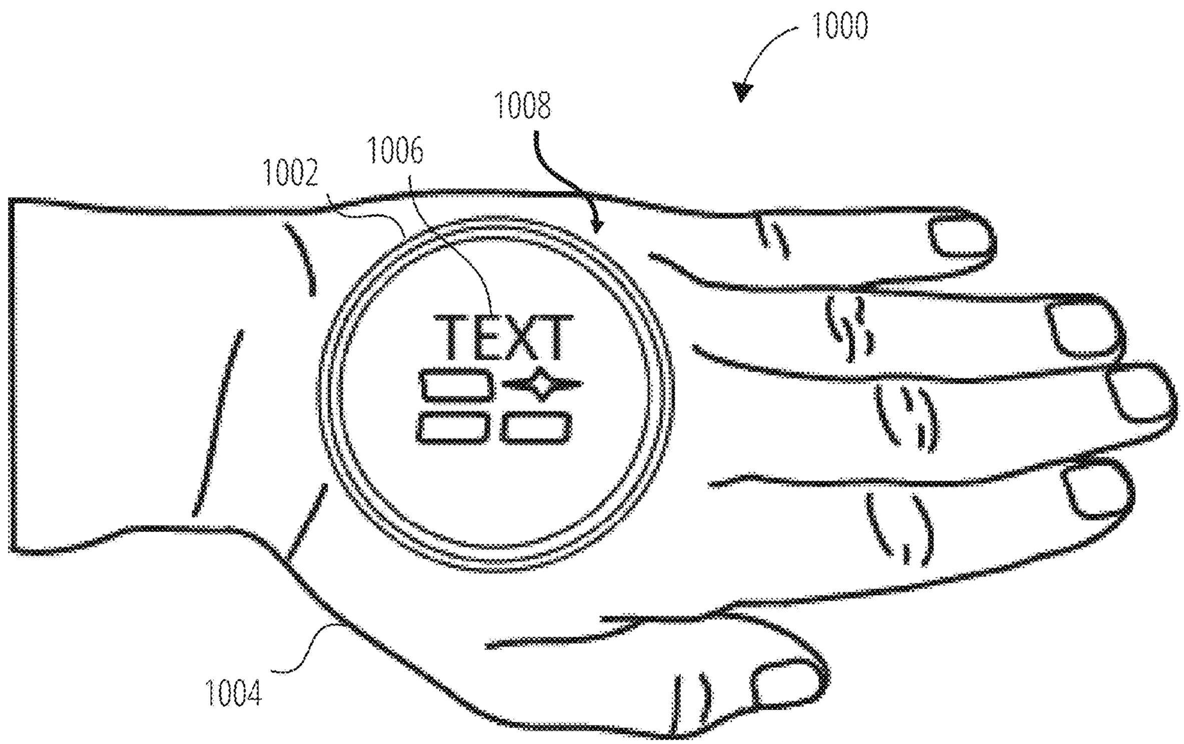

FIG. 8 illustrates a dynamic label method 800, according to some examples. An XR system, such as XR system 510 of FIG. 5, uses the dynamic label method 800 to generate labels for interactive virtual objects included in a hand-located XR user interface. FIG. 9A, FIG. 9B, and FIG. 9C illustrate a palmar hand-located XR user interface 900 that uses interactive virtual objects having dynamic labels, according to some examples. FIG. 10A, FIG. 10B, and FIG. 10C illustrate a dorsal hand-located XR user interface 1000 that uses interactive virtual objects having dynamic labels, Although the example dynamic label method 800 depicts a particular sequence of operations, the sequence may be altered without departing from the scope of the present disclosure. For example, some of the operations depicted may be performed in parallel or in a different sequence that does not materially affect the function of the dynamic label method 800. In other examples, different components of an XR system that implements the dynamic label method 800 may perform functions at substantially the same time or in a specific sequence.

In operation 802, in reference to FIG. 5, an XR system 510 captures, using one or more tracking sensors 520 and one or more pose sensors 548, 3D tracking data 538 of a user. The 3D tracking data 538 includes hand tracking data 522 of a hand of the user and pose data 550 of the XR system 510. For example, the tracking sensors 520 capture detailed information about hand movements, gestures, and position. The one or more tracking sensors 520 can include optical cameras, infrared cameras, depth sensors, and other types of sensors that detect the position, orientation, and motion of the hand in three-dimensional space. The pose sensors 548 gather pose data 550 regarding the orientation and position of the XR system itself. In some examples, the XR system 510 is a head-wearable apparatus 100 of FIG. 1A or similar wearable device. The XR system uses the pose data 550 to determine a viewpoint of the user and how the user is moving within the real-world environment.

The hand tracking data 522 includes precise measurements related to the movements of the user's hand, such as finger positioning, palm orientation, and gesture recognition. This data provides for allowing users to interact naturally with virtual objects and interfaces by using their hands as input devices. The pose data 550 provides context about the position of the XR system 510 relative to the environment of the user 508. The pose data 550 is used to adjust the virtual content based on the viewpoint and movements of the user, ensuring that the virtual elements remain correctly aligned with the real world. The combined data from the tracking sensors 520 and pose sensors 548 enables the XR system 510 to render virtual objects and XR user interfaces that appear to exist within the real-world environment.

In loop 804, the XR system 510 continuously captures the 3D tracking data while the XR system generates and displays a hand-located XR user interface to the user 508. For example, the hand tracking data 522 and the pose data 550 are processed in real-time, allowing the XR system 510 to dynamically update the virtual environment in response to actions of the user 508. This real-time processing is useful for maintaining immersion and ensuring a responsive user experience. By continuing to capture the 3D tracking data 538, the XR system 510 can provide a hand-located XR user interface to the user 508.

In operation 806, the XR system 510 generates, using the 3D tracking data 538, a hand-located user interface including one or more interactive virtual objects associated with respective one or mores locations on a surface of a hand of the user. In some examples, in reference to FIG. 9A, the hand-located XR user interface is a palmar hand-located XR user interface 900 as more fully described in reference to FIG. 6. The palmar hand-located XR user interface 900 includes one or more interactive virtual objects, such as interactive virtual object 904, interactive virtual object 910, interactive virtual object 906, and interactive virtual object 908. In some examples, in reference to FIG. 10A, the hand-located XR user interface is a dorsal hand-located XR user interface 1000 as more fully described in reference to FIG. 7. The dorsal hand-located XR user interface 1000 includes one or more interactive virtual objects, such as interactive virtual object 1002.

In some examples, the XR system 510 renders an interactive virtual object using a set of attributes that define the appearance and behavior of the interactive virtual object. Various sets of attributes may be used render the interactive virtual object depending on a state of a function or action associated with a function or application of the XR system 510. The different renders can be used to convey the state of the interactive virtual object and/or an XR user interface.

In some examples, the XR system renders the interactive virtual object using a set of attributes to give the appearance that the interactive virtual object is a translucent spheroid made of a gelatinous material, such as jelly or the like. The XR system uses soft body physics to simulate the deformation and movement of the interactive virtual object. For example, the XR system generates a 3D spheroid mesh as part of the XR user interface object model 526 of FIG. 5. The XR system 510 determines an interactive virtual object location on the hand where the interactive virtual object will be located and defines a surface of the hand as a plane beneath the 3D spheroid. The XR system 510 adds soft body physics to the 3D spheroid as an attribute when the 3D spheroid is animated. The XR system 510 sets a collision attribute to make the surface of the hand to interact with the soft body 3D spheroid. The XR system generates a soft body simulation for an animation timeline for the 3D spheroid. When rendering an animation based on the timeline, the XR system adds simulated lights to a scene of the animation to highlight the 3D spheroid's translucency and assigns a translucent material to the 3D spheroid.

In some examples, XR system 510 utilizes a hand mesh model to accurately position interactive virtual objects on the user's hand within the XR environment. For example, the XR system 510 uses the 3D tracking data to obtain hand joint data. The hand joint data provides the 3D positions and orientations of hand joints like the wrist, knuckles, and fingertips of the hand of the user. The XR system 510 creates a hand mesh model with vertices and faces that approximate the shape of the hand of the user. As the hand mesh is generated from the 3D tracking data captured from the hand of the user, hand meshes from different users will vary in size because of the distances between landmark in the hand joint data. Accordingly, the hand mesh will fit the hand of the user and allow precise location of the interactive virtual objects as the user moves their hand. The XR system 510 pins the interactive virtual objects to specific UV coordinates on the hand mesh, ensuring that the interactive virtual objects maintain a precise placement relative to the hand's geometry. By integrating the interactive virtual objects directly onto the hand mesh, XR system 510 ensures that the interactive virtual objects are consistently positioned in intuitive locations for the user, enhancing the usability and interaction quality of the hand-located XR user interfaces. This technique allows for a seamless integration of virtual content with the user's natural hand movements, providing a more immersive and intuitive user experience.

In some examples, the XR system 510 uses a calibration process that dynamically adjusts the sizes of interactive virtual objects based on the initial detection of a hand of the user by the one or more tracking sensors 520 of the XR system 510. This calibration process adapts to both partial and full visibility of the hand within a field of view of the one or more tracking sensors 520, ensuring that the interactive virtual objects are appropriately scaled and positioned relative to the movement and orientation of the hand of the user as captured in the tracking data.

In operation 808, the XR system 510 generates, using the interactive virtual object and the pose data 550, a label of the interactive virtual object the label orientated to a viewpoint of the user 508 and in operation 810, the XR system 510 provides the hand-located user interface to the user.

For example, in reference to FIG. 9A, interactive virtual object 904 includes label 912, interactive virtual object 910 includes a label 914, interactive virtual object 908 includes label 920, and interactive virtual object 906 includes label 918. In reference to FIG. 10A, interactive virtual object 1002 includes label 1006. A label can include any type of graphic or text object in any combination or arrangement. In some examples, the label can be used to convey a state of the interactive virtual object, a state or an identity of an application associated with an interactive virtual object, a state or an identity of a function of the XR system 510, and the like.

In some examples, a label can be displayed on a surface of an interactive virtual object. In some examples, a label can be displayed within an interactive virtual object. In some examples, a label can be displayed in a spaced-apart relationship with an interactive virtual object. In some examples, the label can be a 2D object or skin that is applied to a surface of the interactive virtual object. In some examples, a label can be 3D object that is displayed on a surface, within, or in a spaced-apart relationship with the interactive virtual object.

In some examples, a label is rendered to a user so that the label is orientated to a visual axis of a viewpoint of the user so that the user can easily read the label, such as by displaying the label in an upright or vertical orientation relative to the user's orientation. For example, the XR system 510 initializes the label orientation by setting a label object including the label to an initial orientation represented by a label orientation quaternion, such as an identity quaternion which indicates no rotation. As the user interacts with the XR environment, XR system 510 continuously tracks the orientation of the hand of the user using one or more tracking sensors to capture hand tracking data. The hand tracking data is used to generate a hand orientation quaternion representing the orientation of the hand. The XR system 510 calculates the inverse of the hand orientation quaternion, which represents the rotation necessary to counteract the rotation of the hand. To ensure the orientation of the label remains constant relative to the visual axis of the viewpoint of the user, XR system 510 multiplies the label orientation quaternion by the inverse of the hand orientation quaternion. This multiplication effectively neutralizes the hand's rotation, maintaining the orientation of the label relative to the visual axis of the viewpoint of the user. The XR system 510 applies this computed label orientation quaternion to the label object to update the label object's orientation within the real-world environment when the hand-located XR user interface is provided to the user, ensuring that the orientation of the label is consistently readable from the viewpoint of the user.

In some examples, pose data is used to hold constant the orientation of the label relative to the visual axis of the viewpoint of the user as the user moves their head. For example, the XR system 510 sets a label orientation quaternion of a label object including the label to be vertical relative to the real-world environment. As the user interacts with the XR environment and moves their head, the XR system 510 tracks the current location and orientation or pose of the head of the user using one or more pose sensors. The XR system 510 uses the pose data to calculate a head orientation quaternion representing an orientation of the head of the user. To counteract the rotation caused by the user's head movements, the XR system 510 calculates the inverse of the head orientation quaternion. This inverse is then multiplied by the label orientation quaternion to generate a new label orientation quaternion that maintains the orientation of the label relative to the visual axis of the viewpoint of the user. In some examples, to ensure the orientation of the label remains constant, XR system 510 applies a vertical constraint by removing any rotation around the local X and Z axes of the label object. The resultant label orientation quaternion is then applied to the label object of the label when the hand-located XR user interface is provided to the user.

For example, FIG. 9A is an illustration of a palmar hand-located XR user interface 900 from the viewpoint of a user viewing a palmar surface 916 of their hand 902 at an oblique angle. The interactive virtual objects of the palmar hand-located XR user interface 900 appear as oblate spheroids on the palmar surface 916. The interactive virtual objects, namely interactive virtual object 906, interactive virtual object 904, interactive virtual object 910, and interactive virtual object 908, include respective labels, namely label 918, label 912, label 914, and label 920, that are displayed to the user in an orientation relative to a visual axis of the viewpoint of the user such that the labels are readable by the user, such as appearing vertical or upright to the user.

FIG. 9B is an illustration of the palmar hand-located XR user interface 900 from the viewpoint of a user viewing the palmar surface 916 of their hand 902 from a viewpoint that is orthogonal to the palmar surface 916. As the user moves their hand 902, an XR system updates the orientation of label 918, label 912, label 914, and label 920 such that the labels are displayed in an orientation were the labels maintain a constant orientation relative to the visual axis of the user's viewpoint even though the position of the hand 902 in FIG. 9B has changed from the position of the hand 902 in FIG. 9A.

FIG. 9C is an illustration of a palmar hand-located XR user interface 900 from the viewpoint of a user viewing the palmar surface 916 of their hand 902 from a viewpoint that is orthogonal to the palmar surface 916. The hand 902 has been rotated relative to the position of the hand 902 in FIG. 9B. As the user moves their hand 902, the XR system 510 updates the orientation of label 918, label 912, label 914, and label 920 such that the labels are displayed in an orientation were the labels maintain a constant orientation relative to the visual axis of the user's viewpoint even though the position of the hand 902 has changed from the position of the hand 902 in FIG. 9B.

As another example, FIG. 10A is an illustration of a dorsal hand-located XR user interface 1000 from the viewpoint of a user viewing a hand dorsal surface 1008 of their hand 1004 at an oblique angle. One or more interactive virtual objects of the dorsal hand-located XR user interface 1000, such as interactive virtual object 1002, appear as oblate spheroids on the hand dorsal surface 1008. Interactive virtual object 1002 includes a label 1006 displayed to the user in an orientation relative to the visual axis of the viewpoint of the user such that the label is easily read, such as by being vertical or upright.

FIG. 10B is an illustration of the dorsal hand-located XR user interface 1000 from the viewpoint of a user viewing the hand dorsal surface 1008 of their hand 1004 from a viewpoint that is orthogonal to the hand dorsal surface 1008. As the user moves their hand 1004, the XR system 510 updates the orientation of label 1006 such that label 1006 is displayed in an orientation were the label maintains a constant orientation relative to the visual axis of the viewpoint of the user even though the position of the hand 1004 has changed from the position of the hand 1004 in FIG. 10A.

FIG. 10C is an illustration of the dorsal hand-located XR user interface 1000 from the viewpoint of a user viewing the hand dorsal surface 1008 from a viewpoint that is orthogonal to the hand dorsal surface 1008. The hand 1004 has been rotated relative to the position of the hand 1004 in FIG. 10B. As the user moves their hand 1004, the XR system 510 updates the orientation of label 1006 such that label 1006 is displayed in an orientation were the label maintains a constant orientation relative to the visual axis of the viewpoint of the user even though the position of the hand 1004 has changed from the position of the hand 1004 in FIG. 9B.

The palmar hand-located XR user interface 900 comprises a hand 902, an interactive virtual object 904, an interactive virtual object 906, an interactive virtual object 908, an interactive virtual object 910, a label 912, a label 914, a palmar surface 916, a label 918, and a label 920.

The dorsal hand-located XR user interface 1000 comprises an interactive virtual object 1002, a hand 1004, a label 1006, and a hand dorsal surface 1008.

Machine-Learning Pipeline

FIG. 11B is a flowchart depicting a machine-learning pipeline 1116, according to some examples. The machine-learning pipeline 1116 can be used to generate a trained machine-learning model 1118 such as, but not limited to ROI detector model 509 of FIG. 5, tracking model 544 of FIG. 5, 3D coordinate generator model 546 of FIG. FIG. 5, cropping model 562 of FIG. 5, hand touch model 560 of FIG. 5, and the like, to perform operations associated with determining user inputs into an XR system, such as XR system 510 of FIG. 5.

Machine learning can involve using computer algorithms to automatically learn patterns and relationships in data, potentially without the need for explicit programming. Machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that can be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting can be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Generating a trained machine-learning model 1118 can include multiple phases that form part of the machine-learning pipeline 1116, including for example the following phases illustrated in FIG. 11A:

- Data collection and preprocessing 1102: This phase can include acquiring and cleaning data to ensure that it is suitable for use in the machine learning model. This phase can also include removing duplicates, handling missing values, and converting data into a suitable format.
- Feature engineering 1104: This phase can include selecting and transforming the training data 1122 to create features that are useful for predicting the target variable. Feature engineering can include (1) receiving features 1124 (e.g., as structured or labeled data in supervised learning) and/or (2) identifying features 1124 (e.g., unstructured or unlabeled data for unsupervised learning) in training data 1122.
- Model selection and training 1106: This phase can include selecting an appropriate machine learning algorithm and training it on the preprocessed data. This phase can further involve splitting the data into training and testing sets, using cross-validation to evaluate the model, and tuning hyperparameters to improve performance.
- Model evaluation 1108: This phase can include evaluating the performance of a trained model (e.g., the trained machine-learning model 1118) on a separate testing dataset. This phase can help determine if the model is overfitting or underfitting and determine whether the model is suitable for deployment.
- Prediction 1110: This phase involves using a trained model (e.g., trained machine-learning model 1118) to generate predictions on new, unseen data.
- Validation, refinement or retraining 1112: This phase can include updating a model based on feedback generated from the prediction phase, such as new data or user feedback.
- Deployment 1114: This phase can include integrating the trained model (e.g., the trained machine-learning model 1118) into a more extensive system or application, such as a web service, mobile app, or IoT device. This phase can involve setting up APIs, building a user interface, and ensuring that the model is scalable and can handle large volumes of data.

FIG. 11B illustrates further details of two example phases, namely a training phase 1120 (e.g., part of the model selection and trainings 1106) and a prediction phase 1126 (part of prediction 1110). Prior to the training phase 1120, feature engineering 1104 is used to identify features 1124. This can include identifying informative, discriminating, and independent features for effectively operating the trained machine-learning model 1118 in pattern recognition, classification, and regression. In some examples, the training data 1122 includes labeled data, known for pre-identified features 1124 and one or more outcomes. Each of the features 1124 can be a variable or attribute, such as an individual measurable property of a process, article, system, or phenomenon represented by a data set (e.g., the training data 1122). Features 1124 can also be of different types, such as numeric features, strings, and graphs, and can include one or more of content 1128, concepts 1130, attributes 1132, historical data 1134, and/or user data 1136, merely for example.

In training phase 1120, the machine-learning pipeline 1116 uses the training data 1122 to find correlations among the features 1124 that affect a predicted outcome or prediction/inference data 1138.

With the training data 1122 and the identified features 1124, the trained machine-learning model 1118 is trained during the training phase 1120 during machine-learning program training 1140. The machine-learning program training 1140 appraises values of the features 1124 as they correlate to the training data 1122. The result of the training is the trained machine-learning model 1118 (e.g., a trained or learned model).

Further, the training phase 1120 can involve machine learning, in which the training data 1122 is structured (e.g., labeled during preprocessing operations). The trained machine-learning model 1118 implements a neural network 1142 capable of performing, for example, classification and clustering operations. In other examples, the training phase 1120 can involve deep learning, in which the training data 1122 is unstructured, and the trained machine-learning model 1118 implements a deep neural network 1142 that can perform both feature extraction and classification/clustering operations.

In some examples, a neural network 1142 can be generated during the training phase 1120, and implemented within the trained machine-learning model 1118. The neural network 1142 includes a hierarchical (e.g., layered) organization of neurons, with each layer consisting of multiple neurons or nodes. Neurons in the input layer receive the input data, while neurons in the output layer produce the final output of the network. Between the input and output layers, there can be one or more hidden layers, each consisting of multiple neurons.

Each neuron in the neural network 1142 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks can use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1142 can also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1120, a validation phase can be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model can be tested on a new dataset. The testing dataset is used to evaluate the model's performance and ensure that the model has not overfitted the training data.

In prediction phase 1126, the trained machine-learning model 1118 uses the features 1124 for analyzing inference data 1144 to generate inferences, outcomes, or predictions, as examples of a prediction/inference data 1138. For example, during prediction phase 1126, the trained machine-learning model 1118 generates an output. Inference data is provided as an input to the trained machine-learning model 1118, and the trained machine-learning model 1118 generates the prediction/inference data 1138 as output, responsive to receipt of the inference data 1144.

In some examples, the trained machine-learning model 1118 can be a generative AI model. Generative AI is a term that can refer to any type of artificial intelligence that can create new content from training data 1122. For example, generative AI can produce text, images, video, audio, code, or synthetic data similar to the original data but not identical. In cases where the trained machine-learning model 1118 is a generative AI, inference data can include text, audio, image, video, numeric, or media content prompts and the output prediction/inference data 1138 can include text, images, video, audio, code, or synthetic data.

Some of the techniques that can be used in generative AI are:

- Convolutional Neural Networks (CNNs): CNNs can be used for image recognition and computer vision tasks. CNNs can, for example, be designed to extract features from images by using filters or kernels that scan the input image and highlight important patterns.
- Recurrent Neural Networks (RNNs): RNNs can be used for processing sequential data, such as speech, text, and time series data, for example. RNNs employ feedback loops that allow them to capture temporal dependencies and remember past inputs.
- Generative adversarial networks (GANs): GANs can include two neural networks: a generator and a discriminator. The generator network attempts to create realistic content that can "fool" the discriminator network, while the discriminator network attempts to distinguish between real and fake content. The generator and discriminator networks compete with each other and improve over time.
- Variational autoencoders (VAEs): VAEs can encode input data into a latent space (e.g., a compressed representation) and then decode it back into output data. The latent space can be manipulated to generate new variations of the output data. VAEs can use self-attention mechanisms to process input data, allowing them to handle long text sequences and capture complex dependencies.
- Transformer models: Transformer models can use attention mechanisms to learn the relationships between different parts of input data (such as words or pixels) and generate output data based on these relationships. Transformer models can handle sequential data, such as text or speech, as well as non-sequential data, such as images or code.

Figure 12:
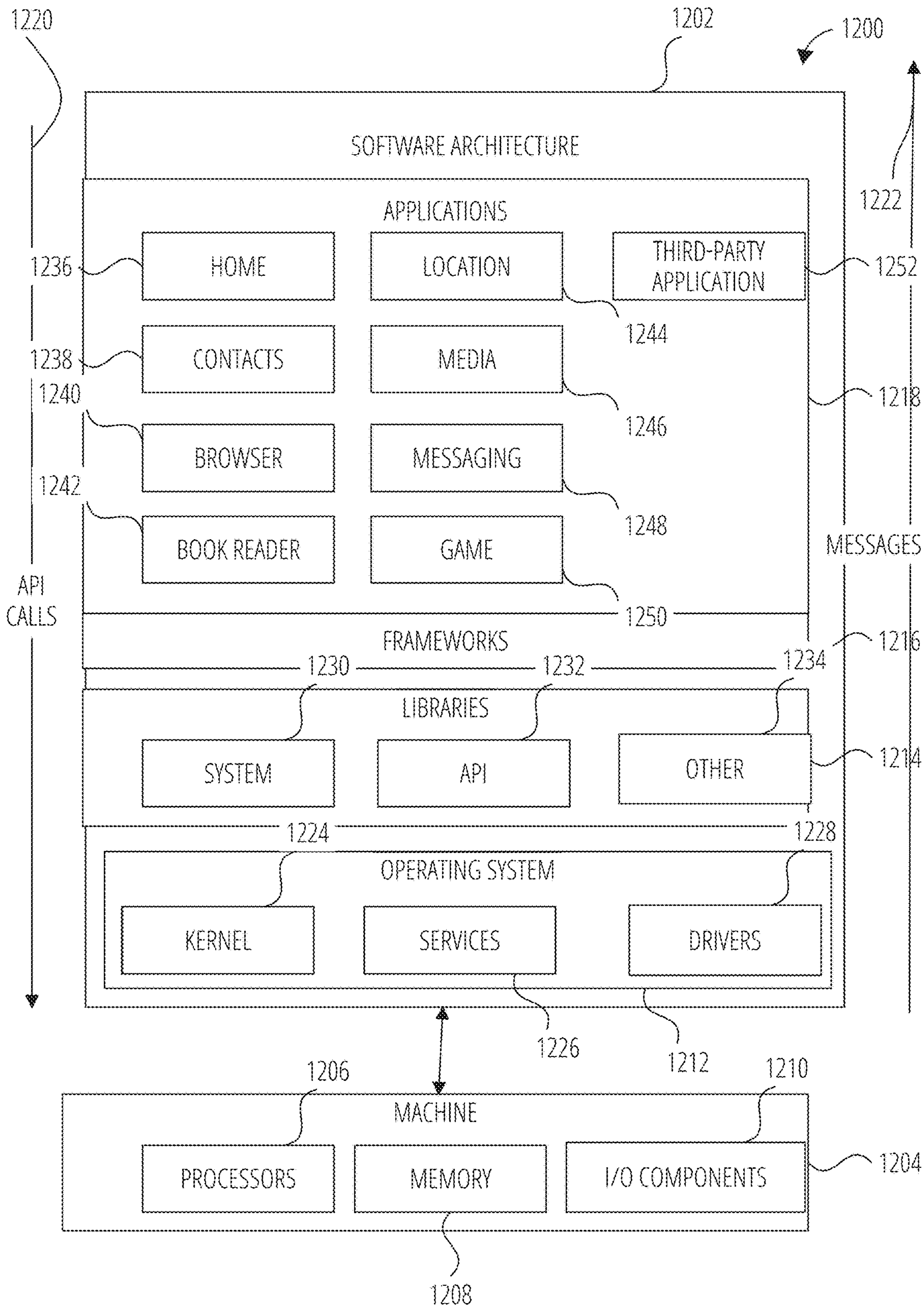
FIG. 12 is a block diagram showing a software architecture, according to some examples.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematical functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which can be specific to a particular operating system or platform.

In an example, the applications 1218 can include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of a platform) can be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

Described implementations of the subject matter can include one or more features, alone or in combination as illustrated below by way of example:

Example 1 is a machine-implemented method, comprising: capturing, using one or more sensors of an extended Reality (XR) system, tracking data of a user, the tracking data including hand tracking data of a hand of the user and pose data of the XR system; while continuously capturing the tracking data and the pose data, performing operations comprising: generating, using the tracking data, a hand-located user interface including an interactive virtual object associated with a location on a surface of the hand; generating, using the interactive virtual object and the pose data, a label associated with the interactive virtual object, the label orientated to a viewpoint of the user; and providing the hand-located user interface to the user.

In Example 2, the subject matter of Example 1 includes, wherein the surface is a dorsal surface of the hand.

In Example 3, the subject matter of any of Examples 1-2 includes, wherein the surface is a palmar surface of the hand.

In Example 4, the subject matter of any of Examples 1-3 includes, measuring, using the tracking data, a distance between a first landmark on the hand and a second landmark on the hand; and adjusting a size of the interactive virtual object using the distance.

In Example 5, the subject matter of any of Example 4 includes, wherein the first landmark is a wrist landmark and the second landmark is a middle knuckle landmark.

In Example 6, the subject matter of any of Examples 4-5 includes, wherein the size is adjusted in steps using a fixed interval.

In Example 7, the subject matter of any of Examples 4-6 includes, wherein the XR system is a head-wearable apparatus.

Example 8 is at least one machine-readable medium including instructions that, when executed by processing circuitry, cause the processing circuitry to perform operations to implement any of Examples 1-7.

Example 9 is an apparatus comprising means to implement any of Examples 1-7.

Example 10 is a system to implement any of Examples 1-7.

Example 11 is a method to implement any of Examples 1-7.

The various features, operations, or processes described herein can be used independently of one another, or can be combined in various ways. All possible combinations and sub-combinations are intended to fall within the scope of this disclosure. In addition, certain method or process blocks can be omitted in some implementations.

Although some examples, e.g., those depicted in the drawings, include a particular sequence of operations, the sequence can be altered without departing from the scope of the present disclosure. For example, some of the operations depicted can be performed in parallel or in a different sequence that does not materially affect the functions as described in the examples. In other examples, different components of an example device or system that implements an example method can perform functions at substantially the same time or in a specific sequence.

Changes and modifications can be made to the disclosed examples without departing from the scope of the present disclosure. These and other changes or modifications are intended to be included within the scope of the present disclosure, as expressed in the appended claims.

Term Examples

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number can also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

"Carrier signal" can include, for example, any intangible medium that can store, encoding, or carrying instructions for execution by the machine and includes digital or analog communications signals or other intangible media to facilitate communication of such instructions. Instructions can be transmitted or received over a network using a transmission medium via a network interface device.

"Client device" can include, for example, any machine that interfaces to a network to obtain resources from one or more server systems or other client devices. A client device can be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user can use to access a network.

"Component" can include, for example, a device, physical entity, or logic having boundaries defined by function or subroutine calls, branch points, APIs, or other technologies that provide for the partitioning or modularization of particular processing or control functions. Components can be combined via their interfaces with other components to carry out a machine process. A component can be a packaged functional hardware unit designed for use with other components and a part of a program that usually performs a particular function of related functions. Components can constitute either software components (e.g., code embodied on a machine-readable medium) or hardware components. A "hardware component" is a tangible unit capable of performing certain operations and can be configured or arranged in a certain physical manner. In various examples, one or more computer systems (e.g., a standalone computer system, a client computer system, or a server computer system) or one or more hardware components of a computer system (e.g., a processor or a group of processors) can be configured by software (e.g., an application or application portion) as a hardware component that operates to perform certain operations as described herein. A hardware component can also be implemented mechanically, electronically, or any suitable combination thereof. For example, a hardware component can include dedicated circuitry or logic that is permanently configured to perform certain operations. A hardware component can be a special-purpose processor, such as a field-programmable gate array (FPGA) or an application-specific integrated circuit (ASIC). A hardware component can also include programmable logic or circuitry that is temporarily configured by software to perform certain operations. For example, a hardware component can include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), can be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor can be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In examples in which multiple hardware components are configured or instantiated at different times, communications between such hardware components can be achieved, for example, through the storage and retrieval of information in memory structures to which the multiple hardware components have access. For example, one hardware component can perform an operation and store the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information). The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions described herein. As used herein, "processor-implemented component" can refer to a hardware component implemented using one or more processors. Similarly, the methods described herein can be at least partially processor-implemented, with a particular processor or processors being an example of hardware. For example, at least some of the operations of a method can be performed by one or more processors or processor-implemented components. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API). The performance of certain of the operations can be distributed among the processors, not only residing within a single machine, but deployed across a number of machines. In some examples, the processors or processor-implemented components can be located in a single geographic location (e.g., within a home environment, an office environment, or a server farm). In other examples, the processors or processor-implemented components can be distributed across a number of geographic locations.

"Computer-readable medium" can include, for example, both machine-storage media and signal media. Thus, the terms include both storage devices/media and carrier waves/modulated data signals. The terms "machine-readable medium," "computer-readable medium" and "device-readable medium" mean the same thing and can be used interchangeably in this disclosure.

"Machine-storage medium" can include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine-storage medium can also refer to cloud storage services, Network Attached Storage (NAS), Storage Area Networks (SAN), and object storage devices. The terms "machine-storage medium," "device-storage medium," "computer-storage medium" mean the same thing and can be used interchangeably in this disclosure. The terms "machine-storage media," "computer-storage media," and "device-storage media" specifically exclude carrier waves, modulated data signals, and other such media, at least some of which are covered under the term "signal medium."

"Network" can include, for example, one or more portions of a network that can be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VoIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network can include a wireless or cellular network, and the coupling can be a Code Division Multiple Access (CDMA) connection, a Global System for Mobile communications (GSM) connection, or other types of cellular or wireless coupling. In this example, the coupling can implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable medium" can include, for example, a tangible medium that is capable of storing, encoding, or carrying the instructions for execution by a machine.

"Processor" can include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" can include multi-core processors that can comprise two or more independent processors (sometimes referred to as "cores") that can execute instructions contemporaneously. These cores can be homogeneous (e.g., all cores are identical, as in multicore CPUs) or heterogeneous (e.g., cores are not identical, as in many modern GPUs and some CPUs). In addition, the term "processor" can also encompass systems with a distributed architecture, where multiple processors are interconnected to perform tasks in a coordinated manner. This includes cluster computing, grid computing, and cloud computing infrastructures. Furthermore, the processor can be embedded in a device to control specific functions of that device, such as in an embedded system, or it can be part of a larger system, such as a server in a data center. The processor can also be virtualized in a software-defined infrastructure, where the processor's functions are emulated in software.

"Signal medium" can include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and can be used interchangeably in this disclosure.

"User device" can include, for example, a device accessed, controlled or owned by a user and with which the user interacts perform an action, engagement or interaction on the user device, including an interaction with other users or computer systems.

What is claimed is:

1. A machine-implemented method, comprising:

capturing, using one or more sensors of an extended Reality (XR) system, tracking data of a user, the tracking data including hand tracking data of a hand of the user and pose data of the XR system;

while continuously capturing the tracking data and the pose data, performing operations comprising:

generating, using the tracking data, a hand-located user interface including an interactive virtual object associated with a location on a surface of the hand;

generating, using the interactive virtual object and the pose data, a label associated with the interactive virtual object, the label orientated to a viewpoint of the user;

continuously adjusting an orientation of the label based on changes of the viewpoint of the user and a position of the hand to maintain readability of the label regardless of hand movement or head movement of the user by counteracting rotation of the hand by applying an inverse of a hand orientation quaternion derived from the hand tracking data to a label orientation quaternion of the label to maintain the orientation of the label relative to a visual axis of the viewpoint of the user; and providing the hand-located user interface to the user.

2. The machine-implemented method of claim 1, wherein the surface is a dorsal surface of the hand.

3. The machine-implemented method of claim 1, wherein the surface is a palmar surface of the hand.

4. The machine-implemented method of claim 1, further comprising:

measuring, using the tracking data, a distance between a first landmark on the hand and a second landmark on the hand; and adjusting a size of the interactive virtual object using the distance.

5. The machine-implemented method of claim 4, wherein the first landmark is a wrist landmark and the second landmark is a middle knuckle landmark.

6. The machine-implemented method of claim 4, wherein the size is adjusted in steps using a fixed interval.

7. The machine-implemented method of claim 1, wherein the XR system is a head-wearable apparatus.

8. A machine comprising:

at least one processor; and at least one memory storing instructions that, when executed by the at least one processor, cause the machine to perform operations comprising:

capturing, using one or more sensors of an extended Reality (XR) system, tracking data of a user, the tracking data including hand tracking data of a hand of the user and pose data of the XR system;

while continuously capturing the tracking data and the pose data, performing operations comprising:

generating, using the tracking data, a hand-located user interface including an interactive virtual object associated with a location on a surface of the hand;

generating, using the interactive virtual object and the pose data, a label associated with the interactive virtual object, the label orientated to a viewpoint of the user;

continuously adjusting an orientation of the label based on changes of the viewpoint of the user and a position of the hand to maintain readability of the label regardless of hand movement or head movement of the user by counteracting rotation of the hand by applying an inverse of a hand orientation quaternion derived from the hand tracking data to a label orientation quaternion of the label to maintain the orientation of the label relative to a visual axis of the viewpoint of the user; and providing the hand-located user interface to the user.

9. The machine of claim 8, wherein the surface is a dorsal surface of the hand.

10. The machine of claim 8, wherein the surface is a palmar surface of the hand.

11. The machine of claim 8, wherein the operations further comprise:

measuring, using the tracking data, a distance between a first landmark on the hand and a second landmark on the hand; and adjusting a size of the interactive virtual object using the distance.

12. The machine of claim 11, wherein the first landmark is a wrist landmark and the second landmark is a middle knuckle landmark.

13. The machine of claim 11, wherein the size is adjusted in steps using a fixed interval.

14. The machine of claim 8, wherein the XR system is a head-wearable apparatus.

15. A machine-storage medium, the machine-storage medium including instructions that, when executed by a machine, cause the machine to perform operations comprising:

capturing, using one or more sensors of an extended Reality (XR) system, tracking data of a user, the tracking data including hand tracking data of a hand of the user and pose data of the XR system;

while continuously capturing the tracking data and the pose data, performing operations comprising:

generating, using the tracking data, a hand-located user interface including an interactive virtual object associated with a location on a surface of the hand;

generating, using the interactive virtual object and the pose data, a label associated with the interactive virtual object, the label orientated to a viewpoint of the user;

continuously adjusting an orientation of the label based on changes of the viewpoint of the user and a position of the hand to maintain readability of the label regardless of hand movement or head movement of the user by counteracting rotation of the hand by applying an inverse of a hand orientation quaternion derived from the hand tracking data to a label orientation quaternion of the label to maintain the orientation of the label relative to a visual axis of the viewpoint of the user; and providing the hand-located user interface to the user.

16. The machine-storage medium of claim 15, wherein the surface is a dorsal surface of the hand.

17. The machine-storage medium of claim 15, wherein the surface is a palmar surface of the hand.

18. The machine-storage medium of claim 15, wherein the operations further comprise:

measuring, using the tracking data, a distance between a first landmark on the hand and a second landmark on the hand; and adjusting a size of the interactive virtual object using the distance.

19. The machine-storage medium of claim 18, wherein the first landmark is a wrist landmark and the second landmark is a middle knuckle landmark.

20. The machine-storage medium of claim 15, wherein the XR system is a head-wearable apparatus.

* * * * *